US012597686B2

(12) United States Patent
Jung et al.

(10) Patent No.: US 12,597,686 B2
(45) Date of Patent: Apr. 7, 2026

(54) BUS BAR ASSEMBLY, BATTERY PACK COMPRISING BUS BAR ASSEMBLY, AND VEHICLE COMPRISING BATTERY PACK

(71) Applicant: LG ENERGY SOLUTION, LTD., Seoul (KR)

(72) Inventors: In-Hyuk Jung, Daejeon (KR); Jin-Oh Yang, Daejeon (KR); Kwang-Keun Oh, Daejeon (KR); Hae-Won Choi, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 460 days.

(21) Appl. No.: 18/018,812

(22) PCT Filed: Mar. 11, 2022

(86) PCT No.: PCT/KR2022/095054
§ 371 (c)(1),
(2) Date: Jan. 30, 2023

(87) PCT Pub. No.: WO2022/191683
PCT Pub. Date: Sep. 15, 2022

(65) Prior Publication Data
US 2023/0307804 A1 Sep. 28, 2023

(30) Foreign Application Priority Data

Mar. 12, 2021 (KR) ........................ 10-2021-0032989
Oct. 12, 2021 (KR) ........................ 10-2021-0135352
(Continued)

(51) Int. Cl.
*H01M 50/583* (2021.01)
*H01M 10/653* (2014.01)
(Continued)

(52) U.S. Cl.
CPC ....... *H01M 50/583* (2021.01); *H01M 10/653* (2015.04); *H01M 50/503* (2021.01);
(Continued)

(58) Field of Classification Search
CPC ............. H01M 50/583; H01M 50/505; H01M 50/581; H01M 50/503; H01M 10/653; H01M 10/6568; H01M 2220/20
See application file for complete search history.

(56) References Cited

U.S. PATENT DOCUMENTS

2002/0022178 A1 2/2002 Asaka et al.
2003/0017383 A1 1/2003 Ura et al.
(Continued)

FOREIGN PATENT DOCUMENTS

CN 101483227 A 7/2009
CN 204029910 U 12/2014
(Continued)

OTHER PUBLICATIONS

U.S. Office Action for U.S. Appl. No. 17/944,431, dated Sep. 30, 2024.
(Continued)

*Primary Examiner* — Devina Pillay
(74) *Attorney, Agent, or Firm* — Birch, Stewart, Kolasch & Birch, LLP

(57) ABSTRACT

Discussed is a battery pack, which can include a plurality of battery cells arranged along a longitudinal direction and a width direction of the battery pack, and a bus bar assembly disposed at one side of the plurality of battery cells and configured to electrically connect the plurality of battery cells. The bus bar assembly includes a connection bus bar connected in series and in parallel to adjacent battery cells of the plurality of battery cells in the longitudinal direction and the width direction, and a fusing portion formed in the
(Continued)

connection bus bar and configured to block an electrical connection of a battery cell in which an abnormal situation occurs in both serial and parallel connection directions from among the plurality of battery cells.

24 Claims, 28 Drawing Sheets

(30) Foreign Application Priority Data

| | | |
|---|---|---|
| Oct. 12, 2021 | (KR) ........................ | 10-2021-0135353 |
| Oct. 12, 2021 | (KR) ........................ | 10-2021-0135354 |
| Oct. 12, 2021 | (KR) ........................ | 10-2021-0135355 |
| Oct. 12, 2021 | (KR) ........................ | 10-2021-0135356 |

(51) Int. Cl.
  *H01M 10/6568* (2014.01)
  *H01M 50/503* (2021.01)
  *H01M 50/505* (2021.01)
  *H01M 50/581* (2021.01)
(52) U.S. Cl.
  CPC ...... *H01M 50/505* (2021.01); *H01M 10/6568* (2015.04); *H01M 50/581* (2021.01); *H01M 2220/20* (2013.01)

(56) References Cited

U.S. PATENT DOCUMENTS

| | | | |
|---|---|---|---|
| 2007/0259258 | A1 | 11/2007 | Buck |
| 2008/0311468 | A1 | 12/2008 | Hermann et al. |
| 2009/0181288 | A1 | 7/2009 | Sato |
| 2009/0208836 | A1 | 8/2009 | Fuhr et al. |
| 2009/0214940 | A1 | 8/2009 | Haussmann |
| 2009/0301700 | A1 | 12/2009 | German et al. |
| 2010/0116570 | A1 | 5/2010 | Sugawara et al. |
| 2011/0091759 | A1 | 4/2011 | Song |
| 2011/0293986 | A1 | 12/2011 | Kozu |
| 2012/0177970 | A1 | 7/2012 | Marchio et al. |
| 2012/0244397 | A1 | 9/2012 | TenHouten et al. |
| 2013/0136970 | A1 | 5/2013 | Kurokawa et al. |
| 2013/0143101 | A1 | 6/2013 | Nakagawa et al. |
| 2013/0202928 | A1 | 8/2013 | Beulque et al. |
| 2013/0230760 | A1 | 9/2013 | Pan et al. |
| 2014/0017531 | A1 | 1/2014 | Uehara et al. |
| 2014/0054629 | A1 | 2/2014 | Kim |
| 2014/0212695 | A1* | 7/2014 | Lane ................... H01M 50/509 |
| | | | 429/7 |
| 2014/0255748 | A1 | 9/2014 | Jan et al. |
| 2015/0050531 | A1* | 2/2015 | Felser ................. H01M 50/583 |
| | | | 429/61 |
| 2015/0050532 | A1 | 2/2015 | Waigel et al. |
| 2015/0099146 | A1 | 4/2015 | Kim et al. |
| 2015/0118530 | A1 | 4/2015 | Lee |
| 2015/0140388 | A1 | 5/2015 | Harada et al. |
| 2016/0133890 | A1 | 5/2016 | Lee et al. |
| 2016/0172727 | A1 | 6/2016 | Chan et al. |
| 2016/0359210 | A1 | 12/2016 | Hasegawa |
| 2017/0047572 | A1 | 2/2017 | Biskup et al. |
| 2017/0125755 | A1 | 5/2017 | Kim et al. |
| 2017/0162922 | A1 | 6/2017 | Sumpf, Jr. et al. |
| 2017/0324128 | A1 | 11/2017 | Milton et al. |
| 2018/0069212 | A1 | 3/2018 | Mastrandrea et al. |
| 2018/0130992 | A1 | 5/2018 | Xu et al. |
| 2018/0212222 | A1 | 7/2018 | Barton et al. |
| 2018/0223070 | A1 | 8/2018 | O'Neil et al. |
| 2018/0277817 | A1 | 9/2018 | Mastrandrea et al. |
| 2018/0366701 | A1 | 12/2018 | Morimitsu et al. |
| 2019/0001838 | A1 | 1/2019 | Choi et al. |
| 2019/0044123 | A1 | 2/2019 | Nishimura et al. |
| 2019/0119021 | A1 | 4/2019 | Baker et al. |
| 2019/0148681 | A1 | 5/2019 | Park et al. |
| 2019/0198952 | A1 | 6/2019 | Choi et al. |
| 2019/0296321 | A1 | 9/2019 | Newman et al. |
| 2019/0348661 | A1 | 11/2019 | Bae |
| 2019/0389318 | A1 | 12/2019 | Lee et al. |
| 2020/0036062 | A1 | 1/2020 | Hirsch et al. |
| 2020/0076022 | A1* | 3/2020 | Kawakami .......... H01M 50/581 |
| 2020/0127249 | A1 | 4/2020 | Yoon et al. |
| 2020/0259152 | A1 | 8/2020 | Lee et al. |
| 2020/0259155 | A1 | 8/2020 | Lee et al. |
| 2020/0274117 | A1 | 8/2020 | Kang et al. |
| 2020/0321589 | A1 | 10/2020 | Watahiki et al. |
| 2020/0350644 | A1 | 11/2020 | Cho et al. |
| 2020/0395587 | A1 | 12/2020 | Ryu et al. |
| 2021/0074965 | A1 | 3/2021 | Kwag |
| 2021/0159567 | A1 | 5/2021 | Pires et al. |
| 2021/0167343 | A1 | 6/2021 | Kwag |
| 2021/0167347 | A1 | 6/2021 | Kwag |
| 2021/0257704 | A1 | 8/2021 | Sawada et al. |
| 2021/0273298 | A1 | 9/2021 | Babinot et al. |
| 2021/0384569 | A1 | 12/2021 | Lee et al. |
| 2022/0081529 | A1 | 3/2022 | O'Neil et al. |
| 2022/0255145 | A1 | 8/2022 | Lee et al. |
| 2022/0263159 | A1 | 8/2022 | Flannery |
| 2022/0263201 | A1* | 8/2022 | Wang ................... H01M 50/30 |
| 2022/0285761 | A1 | 9/2022 | Fang et al. |
| 2022/0294059 | A1 | 9/2022 | Gu et al. |
| 2023/0111495 | A1 | 4/2023 | Jung et al. |
| 2023/0113374 | A1 | 4/2023 | Oh et al. |
| 2023/0113884 | A1 | 4/2023 | Yang et al. |
| 2023/0113945 | A1 | 4/2023 | Jung et al. |
| 2023/0155205 | A1 | 5/2023 | Flannery |
| 2024/0128604 | A1 | 4/2024 | Zhu et al. |
| 2024/0322350 | A1 | 9/2024 | Muratsu et al. |
| 2024/0347810 | A1 | 10/2024 | Oh et al. |
| 2025/0316785 | A1 | 10/2025 | Yang et al. |
| 2025/0385391 | A1 | 12/2025 | Jung et al. |
| 2026/0045646 | A1 | 2/2026 | Yoon et al. |

FOREIGN PATENT DOCUMENTS

| | | |
|---|---|---|
| CN | 205900676 U | 1/2017 |
| CN | 206505995 U | 9/2017 |
| CN | 208111627 U | 11/2018 |
| CN | 109103405 A | 12/2018 |
| CN | 105977578 B | 1/2019 |
| CN | 109390505 A | 2/2019 |
| CN | 208873849 U | 5/2019 |
| CN | 111164795 A | 5/2020 |
| CN | 217522193 U | 9/2022 |
| EP | 2 600 436 A1 | 6/2013 |
| EP | 3 637 494 A1 | 4/2020 |
| GB | 2549512 A | 10/2017 |
| JP | 3-190052 A | 8/1991 |
| JP | 2006-73331 A | 3/2006 |
| JP | 3919257 B2 | 5/2007 |
| JP | 2008-251471 A | 10/2008 |
| JP | 2008-311130 A | 12/2008 |
| JP | 2009-123371 A | 6/2009 |
| JP | 2009-134937 A | 6/2009 |
| JP | 2009-522535 A | 6/2009 |
| JP | 2009-193961 A | 8/2009 |
| JP | 2010-113999 A | 5/2010 |
| JP | 2010-528406 A | 8/2010 |
| JP | 4733248 B2 | 7/2011 |
| JP | 2012-9388 A | 1/2012 |
| JP | 2012-28244 A | 2/2012 |
| JP | 5173227 B2 | 4/2013 |
| JP | 2013-105545 A | 5/2013 |
| JP | 2013-196932 A | 9/2013 |
| JP | 2014-42011 A | 3/2014 |
| JP | 5816877 B2 | 11/2015 |
| JP | 5893133 B2 | 3/2016 |
| JP | 2016-66624 A | 4/2016 |
| JP | 2016-516273 A | 6/2016 |
| JP | 2018-18661 A | 2/2018 |
| JP | 2018-533161 A | 11/2018 |
| JP | 2018-195403 A | 12/2018 |
| JP | 2019-519883 A | 7/2019 |
| JP | 2020-95778 A | 6/2020 |

(56) References Cited

FOREIGN PATENT DOCUMENTS

| JP | 2021-136238 A | 9/2021 |
| JP | 2022-135559 A | 9/2022 |
| KP | 10-1870251 B1 | 6/2018 |
| KR | 10-2010-0134111 A | 12/2010 |
| KR | 10-1093695 B1 | 12/2011 |
| KR | 10-2013-0126159 A | 11/2013 |
| KR | 10-2013-0133160 A | 12/2013 |
| KR | 10-2015-0015169 A | 2/2015 |
| KR | 10-2015-0048501 A | 5/2015 |
| KR | 10-2016-0142171 A | 12/2016 |
| KR | 10-2017-0022460 A | 3/2017 |
| KR | 10-2019-0006984 A | 1/2019 |
| KR | 10-1977454 B1 | 5/2019 |
| KR | 10-2019-0078521 A | 7/2019 |
| KR | 10-2019-0097231 A | 8/2019 |
| KR | 10-2019-0106541 A | 9/2019 |
| KR | 10-2019-0112467 A | 10/2019 |
| KR | 10-2019-0132631 A | 11/2019 |
| KR | 10-2020-0012547 A | 2/2020 |
| KR | 10-2020-0048207 A | 5/2020 |
| KR | 10-2020-0084402 A | 7/2020 |
| KR | 10-2020-0097511 A | 8/2020 |
| KR | 10-2021-0019891 A | 2/2021 |
| KR | 10-2021-0061829 A | 5/2021 |
| KR | 10-2021-0067636 A | 6/2021 |
| KR | 10-2021-0067756 A | 6/2021 |
| KR | 10-2021-0080256 A | 6/2021 |
| KR | 10-2021-0092756 A | 7/2021 |
| KR | 10-2021-0108127 A | 9/2021 |
| WO | WO 2009/154855 A2 | 12/2009 |
| WO | WO 2011/149075 A1 | 12/2011 |
| WO | WO 2015/155919 A1 | 10/2015 |
| WO | WO 2017/110036 A1 | 6/2017 |
| WO | WO 2017/196801 A1 | 11/2017 |
| WO | WO 2018/124494 A2 | 7/2018 |
| WO | WO 2018/221004 A1 | 12/2018 |
| WO | WO 2019/058938 A1 | 3/2019 |
| WO | WO 2019/132291 A1 | 7/2019 |
| WO | WO 2019/244392 A1 | 12/2019 |
| WO | WO 2020/071394 A1 | 4/2020 |
| WO | WO 2020/094365 A1 | 5/2020 |
| WO | WO 2021/074571 A1 | 4/2021 |
| WO | WO 2021/102340 A1 | 5/2021 |
| WO | WO2024/144159 A1 | 7/2024 |

OTHER PUBLICATIONS

U.S. Office Action for U.S. Appl. No. 17/944,431, dated Apr. 4, 2024.

International Search Report (PCT/ISA/210) issued in PCT/KR2022/095054, dated Jun. 21, 2022.

U.S. Office Action for U.S. Appl. No. 17/944,431, dated Nov. 24, 2023.

U.S. Office Action for U.S. Appl. No. 17/944,452, dated Apr. 24, 2025.

Extended European Search Report for European Application No. 22881266.5, dated Feb. 3, 2025.

European Communication pursuant to Article 94(3) EPC for European Application No. 22 767 579.0, dated Jul. 21, 2025.

U.S. Office Action for U.S. Appl. No. 17/944,768, dated May 13, 2025.

Xue et al., "Improvement in thermal conductivity of through-plane aligned boron nitride/silicone rubber composites," Materials and Design 165, Jan. 3, 2019, pp. 1-8.

U.S. Office Action for U.S. Appl. No. 17/944,846, dated May 19, 2025.

U.S. Office Action for U.S. Appl. No. 17/944,452, dated Nov. 5, 2025.

U.S. Office Action for U.S. Appl. No. 17/944,768, dated Nov. 24, 2025.

U.S. Office Action for U.S. Appl. No. 17/944,846, dated Jan. 16, 2026.

U.S. Office Action for U.S. Appl. No. 17/944,672, dated Feb. 20, 2026.

U.S. Office Action for U.S. Appl. No. 17/944,768, dated Feb. 13, 2026.

* cited by examiner

BUS BAR ASSEMBLY, BATTERY PACK COMPRISING BUS BAR ASSEMBLY, AND VEHICLE COMPRISING BATTERY PACK

TECHNICAL FIELD

The present disclosure relates to a bus bar assembly, a battery pack including the bus bar assembly, and a vehicle including the battery pack, and more particularly, to a bus bar assembly capable of securing safety, a battery pack including the bus bar assembly, and a vehicle including the battery pack.

The present application claims priority to Korean Patent Application No. 10-2021-0032989 filed on Mar. 12, 2021 in the Republic of Korea, Korean Patent Application No. 10-2021-0135352 filed on Oct. 12, 2021 in the Republic of Korea, Korean Patent Application No. 10-2021-0135353 filed on Oct. 12, 2021 in the Republic of Korea, Korean Patent Application No. 10-2021-0135354 filed on Oct. 12, 2021 in the Republic of Korea, Korean Patent Application No. 10-2021-0135355 filed on Oct. 12, 2021 in the Republic of Korea, and Korean Patent Application No. 10-2021-0135356 filed on Oct. 12, 2021 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack or a battery rack by using at least one battery module and adding other components.

The conventional battery pack is configured to include a plurality of battery cells and a bus bar assembly for electrically connecting the plurality of battery cells. Here, the conventional bus bar assembly guides the electrical connection of the battery cells by connecting the plurality of battery cells in series and parallel to each other, and includes a fusing portion for blocking the electrical connection of a battery cell when an abnormal situation occurs.

However, in the conventional battery pack, when an abnormal situation occurs, the fusing portion blocks the electrical connection of the battery cell in only one of the parallel direction or the series direction, so the battery cell in which the abnormal situation occurs cannot be completely separated from other battery cells.

Accordingly, the conventional battery pack has a problem in that, when an abnormal situation occurs, there is a large risk of performance degradation of all battery cells after blocking the electrical connection through the fusing portion. Moreover, even after the electrical connection of the fusing portion is blocked, the battery cell in which an abnormal situation occurs may affect adjacent battery cells, which may lead to a serious risk to the safety of use, such as chain explosion.

DISCLOSURE

Technical Problem

Therefore, the present disclosure is directed to providing a battery pack capable of blocking the electrical connection of a battery cell in which an abnormal situation occurs in both series and parallel connection directions to secure safety, and a vehicle including the battery pack.

However, the technical problems to be solved by the present disclosure are not limited to the above, and other problems not mentioned herein will be clearly understood by those skilled in the art from the following disclosure.

Technical Solution

In one aspect of the present disclosure, there is provided a battery pack, that may include: a plurality of battery cells arranged along a longitudinal direction and a width direction of the battery pack; and a bus bar assembly disposed at one side of the plurality of battery cells and configured to electrically connect the plurality of battery cells, wherein the bus bar assembly includes: a connection bus bar connected in series and in parallel to adjacent battery cells of the plurality of battery cells in the longitudinal direction and the width direction; and a fusing portion formed in the connection bus bar and configured the block an electrical connection of a battery cell in which an abnormal situation occurs in both serial and parallel connection directions from among the plurality of battery cells.

The connection bus bar may be provided as a single layer in a strip shape having a predetermined length and width.

The fusing portion may be integrally formed in the connection bus bar.

The connection bus bar may include a parallel connection portion formed along any one of the longitudinal direction and the width direction and configured to connect the adjacent battery cells in parallel; a serial connection portion formed along the other one of the longitudinal direction and the width direction and configured to connect the adjacent battery cells in series; and an interconnection portion configured to connect the parallel connection portion and the serial connection portion to each other.

The fusing portion may be integrally formed in the interconnection portion.

The fusing portion may be configured to reduce a width of the interconnection portion.

The fusing portion may be formed to be recessed from the interconnection portion by a predetermined depth.

The fusing portion may be formed at each corner of an edge of the interconnection portion.

The fusing portion may have a hole shape of a predetermined size capable of reducing a width of an edge of the interconnection portion.

The fusing portion may be configured to sequentially block the electrical connection of the parallel connection portion and the serial connection portion connected to the battery cell in which the abnormal situation occurs from among the plurality of battery cells.

The serial connection portion may include a positive electrode connection portion configured to protrusively extend from the interconnection portion by a predetermined length; and a negative electrode connection portion provided at a side opposite to the positive electrode connection portion and configured to protrusively extend from the interconnection portion by a predetermined length.

In a height direction of the bus bar assembly, a height between the positive electrode connection portion and the negative electrode connection portion may be equal to a protrusion height of a positive electrode at one surface of a battery cell from among the plurality of battery cells.

In the height direction of the bus bar assembly, a height of the interconnection portion may be greater than a height of the positive electrode connection portion and the negative electrode connection portion.

The bus bar assembly may include a bus bar cover configured to cover the connection bus bar.

The bus bar cover may be provided as a pair, and the connection bus bar may be inserted between the pair of bus bar covers.

The pair of bus bar covers may include a first cover configured to cover one side of the connection bus bar; and a second cover coupled to the first cover and configured to cover the other side of the connection bus bar.

The bus bar cover may have a bus bar hole having an open space of a predetermined size capable of exposing the serial connection portion.

The bus bar hole may be formed to have an open space with a greater size than the serial connection portion.

The bus bar cover may include an insulating material.

The bus bar cover may include a polyimide film.

The connection bus bar may be provided in plural, and the bus bar cover may to cover the plurality of connection bus bars.

The bus bar cover may have a guide hole formed to guide an assembling location of the bus bar assembly.

The strip shape may correspond to an arrangement structure of the plurality of battery cells.

In another aspect of the present disclosure, there is also provided a vehicle that may include at least one of the battery pack according to the above listed embodiments.

In another aspect of the present disclosure, there is also provided a bus bar assembly, which electrically connects of battery cells of a battery pack, and which may include: a connection bus bar having a strip shape with a predetermined length and width and configured to be connected in series and in parallel to the plurality of battery cells; and a fusing portion formed in the connection bus bar and configured to block an electrical connection of a battery cell in which an abnormal situation occurs in both serial and parallel connection directions from among the plurality of battery cells.

The connection bus bar may be provided as a single layer.

The fusing portion may be integrally formed in the connection bus bar.

The connection bus bar may include a parallel connection portion formed along any one of a longitudinal direction and a width direction of the bus bar assembly and configured to connect the plurality of battery cells in parallel; a serial connection portion formed along the other one of the longitudinal direction and the width direction of the bus bar assembly and configured to connect the plurality of battery cells in series; and an interconnection portion configured to connect the parallel connection portion and the serial connection portion to each other.

The fusing portion may be integrally formed in the interconnection portion.

The fusing portion may be configured to reduce a width of the interconnection portion.

Advantageous Effects

According to various embodiments as described above, it is possible to provide a bus bar assembly, which may secure safety by blocking the electrical connection of a battery cell in which an abnormal situation occurs in both series and parallel connection directions, a battery pack including the bus bar assembly, and a vehicle including the battery pack.

In addition, various other additional effects may be achieved by various embodiments of the present disclosure. Various effects of the present disclosure will be described in detail in each embodiment, or any effects that can be easily understood by those skilled in the art will not be described.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 11 is an enlarged view for illustrating a main part of the connection bus bar unit of FIG. 10.

FIG. 12 is a diagram for illustrating a connection bus bar unit of the bus bar assembly of FIG. 9.

FIG. 27 is a diagram for illustrating an arrangement relationship of the battery cells and the cooling units through the side structure unit of FIG. 23.

FIG. 29 is an enlarged bottom view showing a main part of the side structure unit of FIG. 28.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
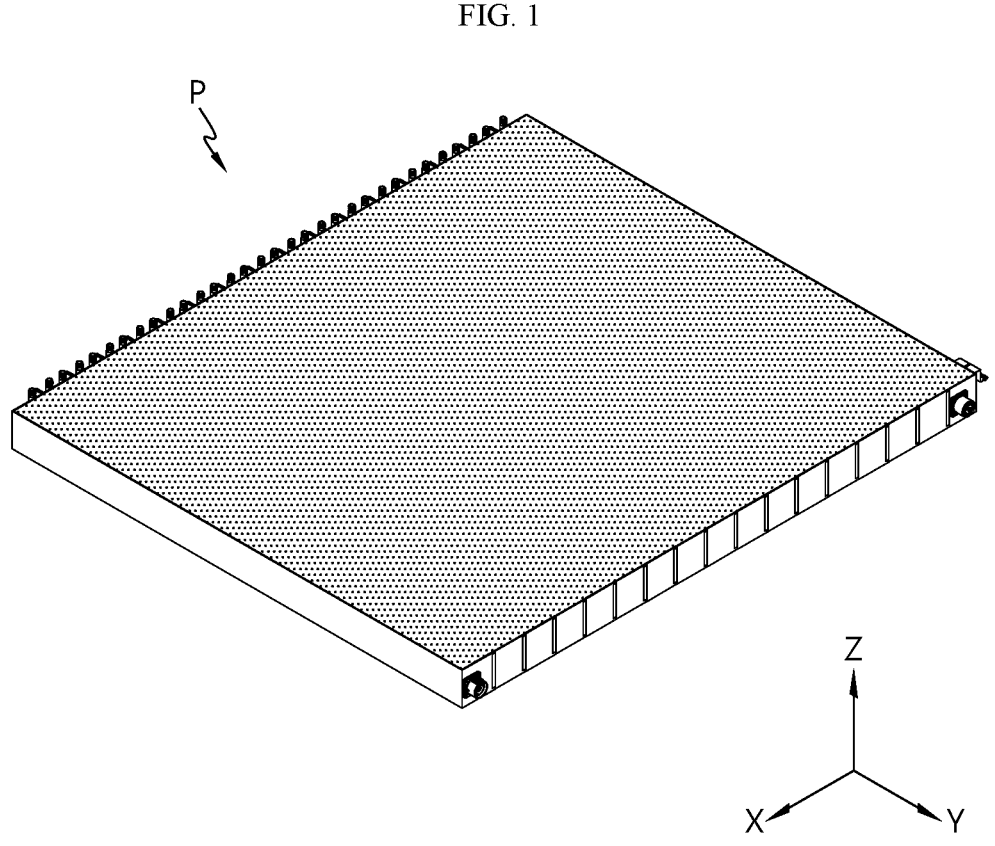
FIG. 1 is a diagram for illustrating a battery pack according to an embodiment of the present disclosure.
Figure 2:
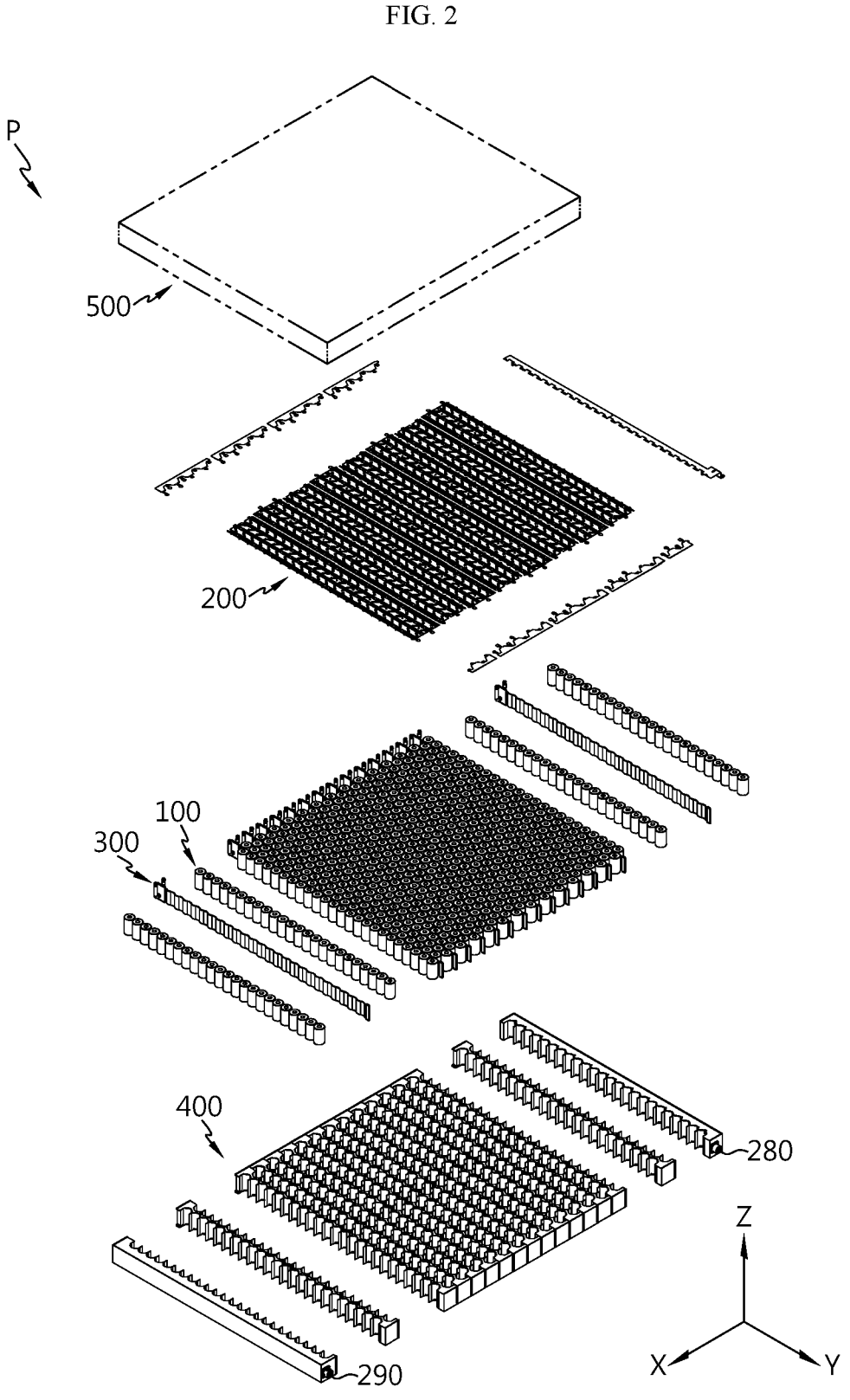
FIG. 2 is an exploded perspective view showing the battery pack of FIG. 1.

FIG. 1 is a diagram for illustrating a battery pack according to an embodiment of the present disclosure, and FIG. 2 is an exploded perspective view showing the battery pack of FIG. 1.

Referring to FIGS. 1 and 2, the battery pack P may be provided to an electric vehicle or a hybrid electric vehicle as an energy source. Hereinafter, the battery pack P provided to the electric vehicle or the like will be described later in more detail with reference to the related drawings.

The battery pack P may include a plurality of battery cells 100 and a bus bar assembly 200.

The plurality of battery cells 100 may be arranged along a longitudinal direction (Y-axis direction) and a width direction (X-axis direction) of the battery pack P. For example, the plurality of battery cells 100 may be arranged in a substantially matrix shape.

The plurality of battery cells 100 may be provided as secondary batteries, such as cylindrical secondary batteries, pouch-type secondary batteries, or rectangular secondary batteries. Hereinafter, in this embodiment, the plurality of battery cells 100 will be described as cylindrical secondary batteries.

Hereinafter, each battery cell 100 will be described in more detail with reference to the related drawings.

Figure 3:
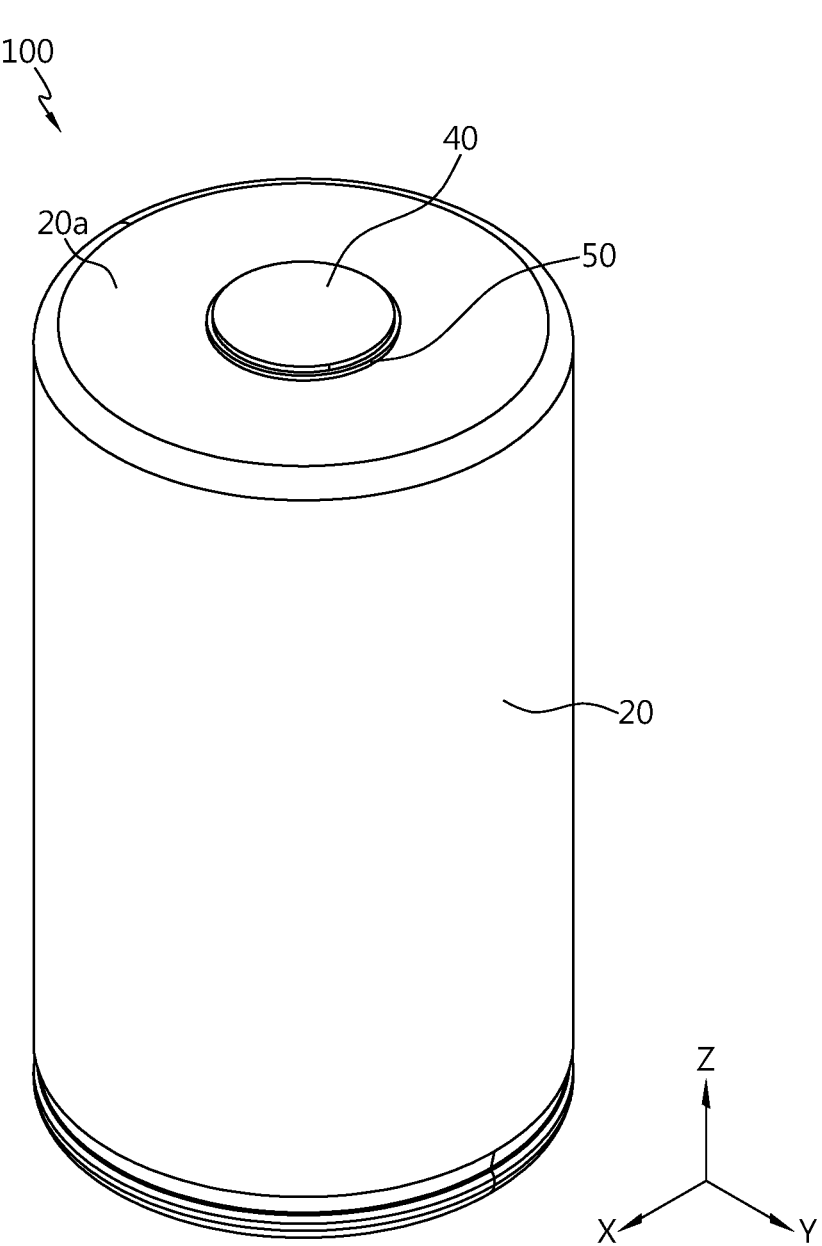
FIG. 3 is a diagram for illustrating a battery cell of the battery pack of FIG. 2.
Figure 4:
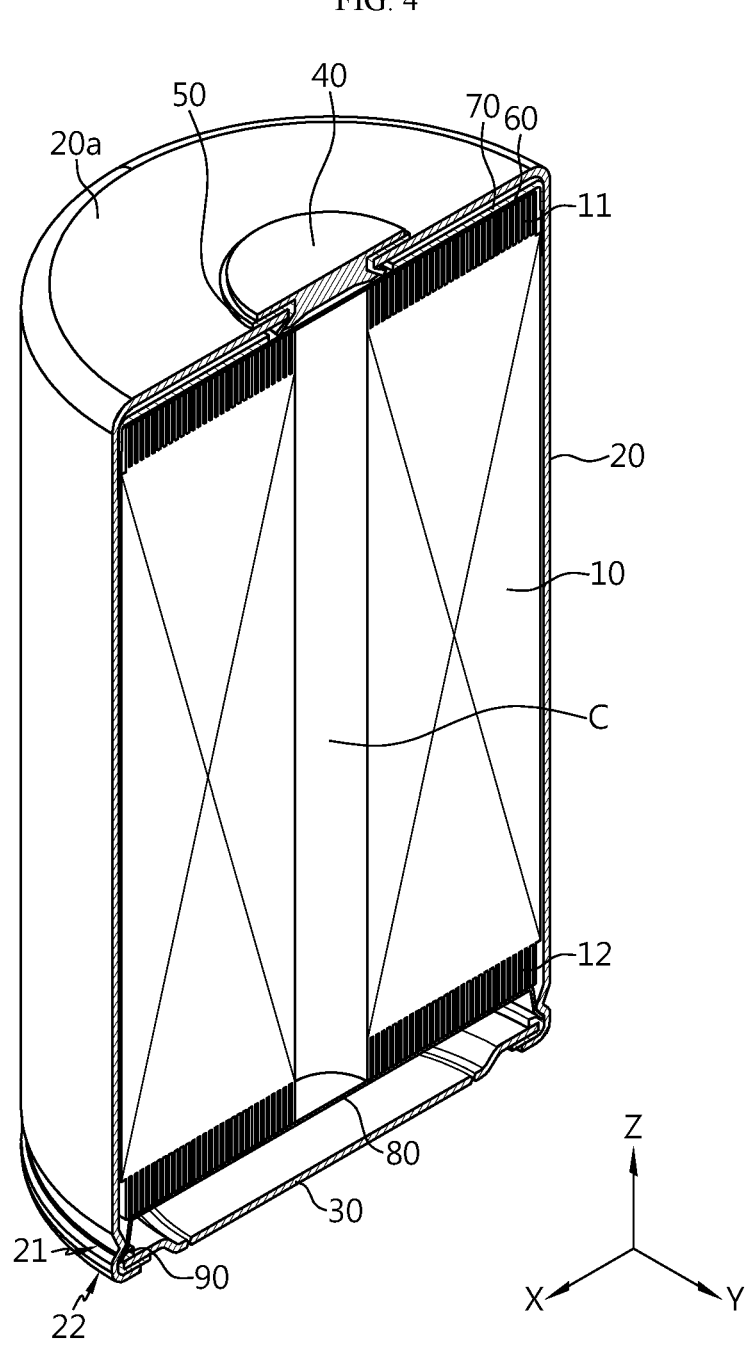
FIG. 4 is a partially sectioned view showing an inner structure of the battery cell of FIG. 3.
Figure 5:
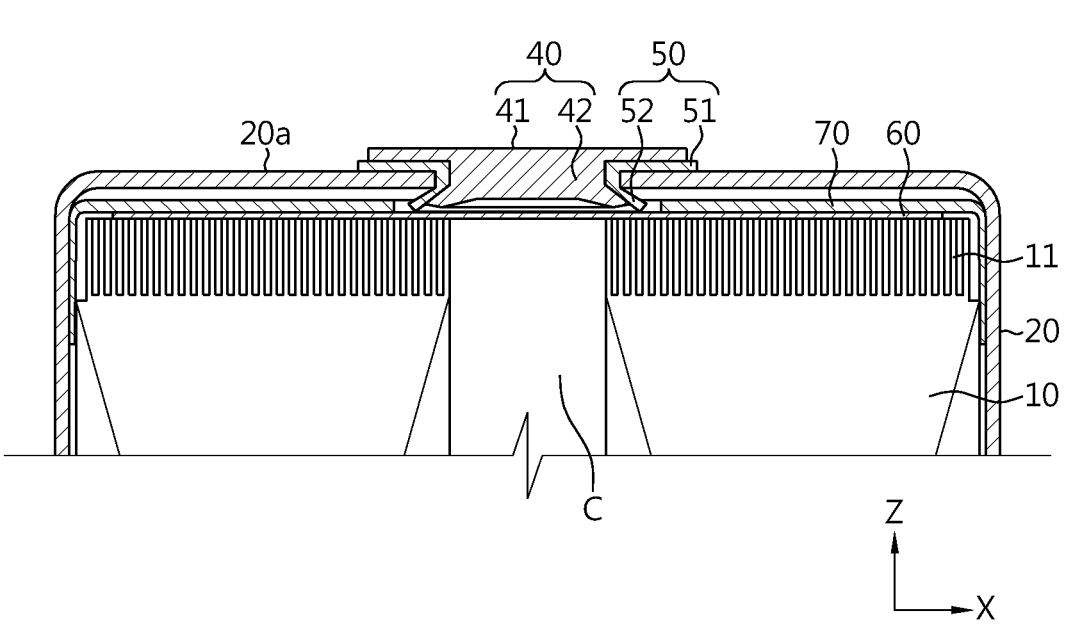
FIG. 5 is a partially sectioned view showing an upper structure of the battery cell of FIG. 3.
Figure 6:
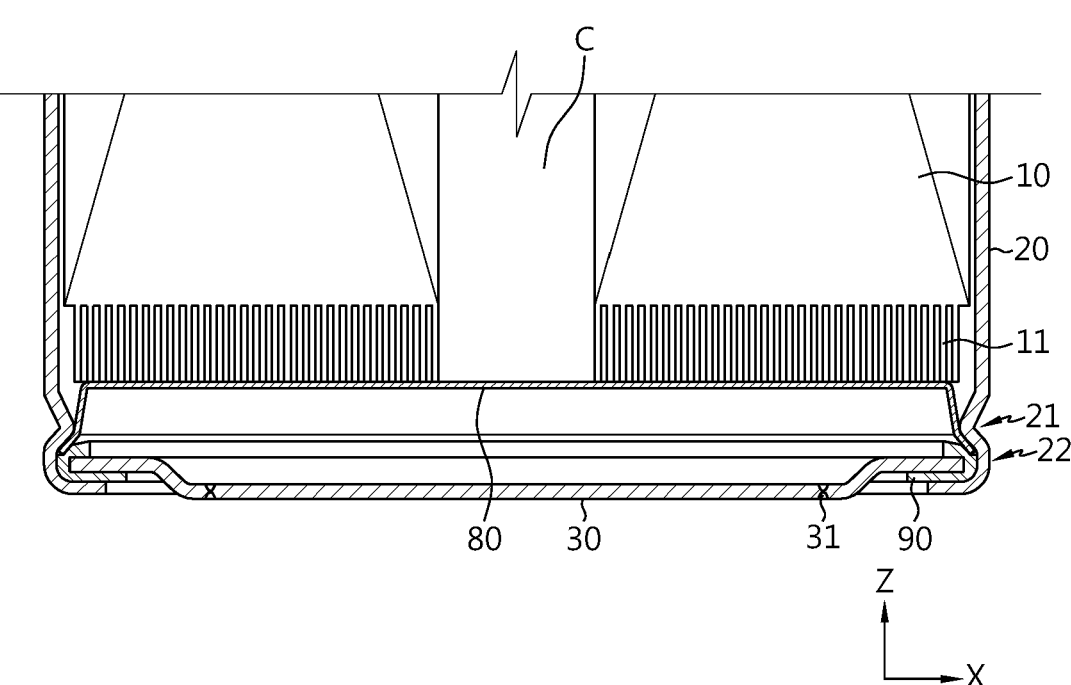
FIG. 6 is a partially sectioned view showing a lower structure of the battery cell of FIG. 3.
Figure 7:
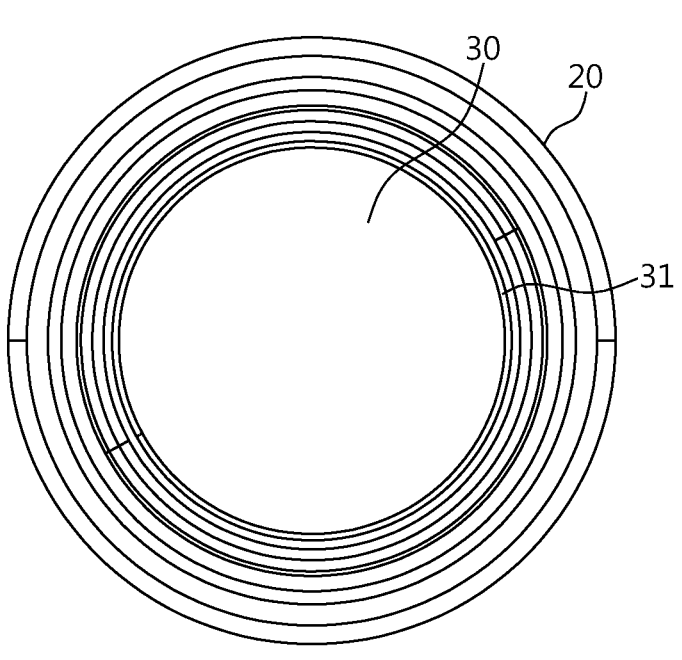
FIG. 7 is a bottom view showing of the battery cell of FIG. 3.

FIG. 3 is a diagram for illustrating a battery cell of the battery pack of FIG. 2, FIG. 4 is a partially sectioned view showing an inner structure of the battery cell of FIG. 3, FIG. 5 is a partially sectioned view showing an upper structure of the battery cell of FIG. 3, FIG. 6 is a partially sectioned view showing a lower structure of the battery cell of FIG. 3, and FIG. 7 is a bottom view showing of the battery cell of FIG. 3.

Referring to FIGS. 3 to 7, the battery cell 100 includes an electrode assembly 10, a battery can 20, a cap plate 30, and a first electrode terminal 40. The battery cell 100 may further include an insulation gasket 50 and/or an upper current collecting plate 60 and/or an insulation plate 70 and/or a lower current collecting plate 80 and/or a sealing gasket 90 in addition to the above components.

The electrode assembly 10 includes a first electrode plate having a first polarity, a second electrode plate having a second polarity, and a separator interposed between the first electrode plate and the second electrode plate. The first electrode plate is a positive electrode plate or a negative electrode plate, and the second electrode plate corresponds to an electrode plate having a polarity opposite to that of the first electrode plate.

The electrode assembly 10 may have, for example, a jelly-roll shape. That is, the electrode assembly 10 may be manufactured by winding a stack formed by sequentially stacking the first electrode plate, the separator and the second electrode plate at least once with reference to a winding center C. In this case, the separator may be provided on an outer peripheral surface of the electrode assembly 10 for insulation from the battery can 20.

The first electrode plate includes a first electrode current collector and a first electrode active material applied on one surface or both surfaces of the first electrode current collector. At one end of the first electrode current collector in the width direction (parallel to the Z-axis), an uncoated region where the first electrode active material is not applied is present. The uncoated region functions as a first electrode tab. The first electrode tab 11 is provided at an upper portion of the electrode assembly 10 accommodated in the battery can 20 in the height direction (parallel to the Z-axis).

The second electrode plate includes a second electrode current collector and a second electrode active material applied on one surface or both surfaces of the second electrode current collector. At the other end of the second electrode current collector in the width direction (parallel to the Z axis), an uncoated region where the second electrode active material is not applied is present. The uncoated region functions as a second electrode tab 12. The second electrode tab 12 is provided at an upper portion of the electrode assembly 10 accommodated in the battery can 20 in the height direction (parallel to the Z-axis).

The battery can 20 is a cylindrical container with an opening at a bottom thereof, and is made of a metal material with conductivity. The side and upper surfaces of the battery can 20 are integrally formed. The upper surface of the battery can 20 has an approximately flat shape. The battery can 20 accommodates the electrode assembly 10 through the opening formed at the bottom, and also accommodates the electrolyte together.

The battery can 20 is electrically connected to the second electrode tab 12 of the electrode assembly 10. Therefore, the battery can 20 has the same polarity as the second electrode tab 12.

The battery can 20 may include a beading portion 21 and a crimping portion 22 formed at the lower end thereof. The beading portion 21 is formed at a lower portion of the electrode assembly 10. The beading portion 21 is formed by press-fitting the outer peripheral surface of the battery can 20. The beading portion 21 prevents the electrode assembly 10 having a size corresponding to the width of the battery can 20 from coming out through the opening formed at the bottom of the battery can 20, and may function as a support on which the cap plate 30 is placed.

The crimping portion 22 is formed under the beading portion 21. The crimping portion 22 has an extended and bent shape so as to surround the outer peripheral surface of the cap plate 30 disposed below the beading portion 21 and a portion of the lower surface of the cap plate 30.

The cap plate 30 is a part made of a metal material with conductivity, and covers the opening formed at the bottom of the battery can 20. That is, the cap plate 30 forms the lower surface of the battery cell 100. The cap plate 30 is placed on the beading portion 21 formed at the battery can 20, and is fixed by the crimping portion 22. An airtight gasket 90 may be interposed between the cap plate 30 and the crimping portion 22 of the battery can 20 to secure the airtightness of the battery can 20.

The cap plate 30 may further include a venting portion 31 formed to prevent an increase in internal pressure due to gas generated inside the battery can 20. The venting portion 31 corresponds to a region having a thinner thickness compared to the surrounding region of the cap plate 30. The venting portion 31 is structurally weak compared to the surrounding region. Accordingly, when an abnormality occurs in the battery cell 100 to increase the internal pressure to a certain level or above, the venting portion 31 is ruptured so that the gas generated inside the battery can 20 is discharged.

The battery cell 100 according to an embodiment of the present disclosure has a structure in which both a positive electrode terminal and a negative electrode terminal are present on an upper portion thereof, and thus the upper structure is more complicated than the lower structure. Accordingly, the venting portion 31 may be formed at the cap plate 30 that forms the lower surface of the battery cell 100 in order to smoothly discharge the gas generated in the battery can 20.

The venting portion 31 may be continuously formed in a circle on the cap plate 30. The present invention is not limited thereto, and the venting portion 31 may also be discontinuously formed in a circle on the cap plate 30, or may be formed in a straight shape or other shapes.

The first electrode terminal 40 is made of a metal material with conductivity and passes through the upper surface of the battery can 20 to be electrically connected to the first electrode tab 11 of the electrode assembly 10. Therefore, the first electrode terminal 40 has the first polarity. The first electrode terminal 40 is electrically insulated from the battery can 20 with the second polarity.

The first electrode terminal 40 includes an exposed terminal portion 41 and an inserted terminal portion 42. The exposed terminal portion 41 is exposed to the outside of the battery can 20. The exposed terminal portion 41 is located in the center of the upper surface of the battery can 20. The inserted terminal portion 42 is electrically connected to the first electrode tab 11 through the central portion of the upper surface of the battery can 20. The inserted terminal portion 42 may be riveted on the inner surface of the battery can 20.

The upper surface of the battery can 20 and the first electrode terminal 40 have opposite polarities and face the same direction. In addition, a step may be formed between the first electrode terminal 40 and the upper surface of the battery can 20. Specifically, when the entire upper surface of the battery can 20 has a flat shape or the upper surface of the battery can 20 has a shape protruding upward from the center thereof, the exposed terminal portion 41 of the first electrode terminal 40 may protrude upward further to the upper surface of the battery can 20. On the contrary, when the upper surface of the battery can 20 has a shape that is concavely recessed downward from the center, namely toward the electrode assembly 10, the upper surface of the battery can 20 may protrude upward further to the exposed terminal portion 41 of the electrode terminal 40.

The insulation gasket 50 is interposed between the battery can 20 and the first electrode terminal 40 to prevent the battery can 20 and the first electrode terminal 40 having opposite polarities from contacting each other. Accordingly, the upper surface of the battery can 20 having an approximately flat shape may function as a second electrode terminal of the battery cell 100.

The insulation gasket 50 includes an exposed portion 51 and an insert portion 52. The exposed portion 51 is interposed between the exposed terminal portion 41 of the first electrode terminal 40 and the battery can 20. The insert portion 52 is interposed between the inserted terminal portion 42 of the first electrode terminal 40 and the battery can 20. The insulation gasket 50 may be made of, for example, a resin material having insulation.

In the case where the insulation gasket 50 is made of a resin material, the insulation gasket 50 may be coupled with the battery can 20 and the first electrode terminal 40 by thermal fusion. In this case, the airtightness at the bonding interface between the insulation gasket 50 and the first electrode terminal 40 and at the bonding interface between the insulation gasket 50 and the battery can 20 may be strengthened.

The entire area of the upper surface of the battery can 20, except for the area occupied by the first electrode terminal 40 and the insulation gasket 50, corresponds to the second electrode terminal 20a having a polarity opposite to that of the first electrode terminal 40.

The battery cell 100 according to an embodiment of the present disclosure includes a first electrode terminal 40 having a first polarity and a second electrode terminal 20a electrically insulated from the first electrode terminal 40 and having a second polarity together at one side thereof in the longitudinal direction (parallel to the Z-axis). That is, in the battery cell 100 according to an embodiment of the present disclosure, since the pair of electrode terminals 40, 20a are positioned in the same direction, in the case of electrically connecting the plurality of battery cells 100, it is possible that electrical connection parts such as the bus bar assembly 200, explained later, are disposed at only one side of the battery cells 100. This may bring about structure simplification of the battery pack P and improvement of energy density.

Hereinafter, the bus bar assembly 200 for electrical connection with the plurality of battery cells 100 will be described in more detail.

Referring to FIG. 2 again, the bus bar assembly 200 may be provided at one side of the battery cells 100, specifically at an upper side (+Z-axis direction) of the battery cells 100, and may be electrically connected to the plurality of battery cells 100. The electrical connection of the bus bar assembly 200 may be parallel and/or series connections. Hereinafter, in this embodiment, the electrical connection of the bus bar assembly 200 may be parallel and serial connection.

The bus bar assembly 200 is electrically connected to the first electrode terminal 40 (see FIG. 3) of the plurality of battery cells 100 having the first polarity and the battery can 20 see FIG. 3) having the second polarity, and may be electrically connected to an external charging/discharging line, or the like through connector terminals 280, 290, or the like. Here, the first polarity may be a positive polarity, and the second polarity may be a negative polarity.

Hereinafter, in this embodiment, it will be described that the first electrode terminal 40 is a positive electrode and the second electrode terminal 20*a* is a negative electrode.

Hereinafter, the configuration of the bus bar assembly 200 will be described in more detail.

Figure 8:
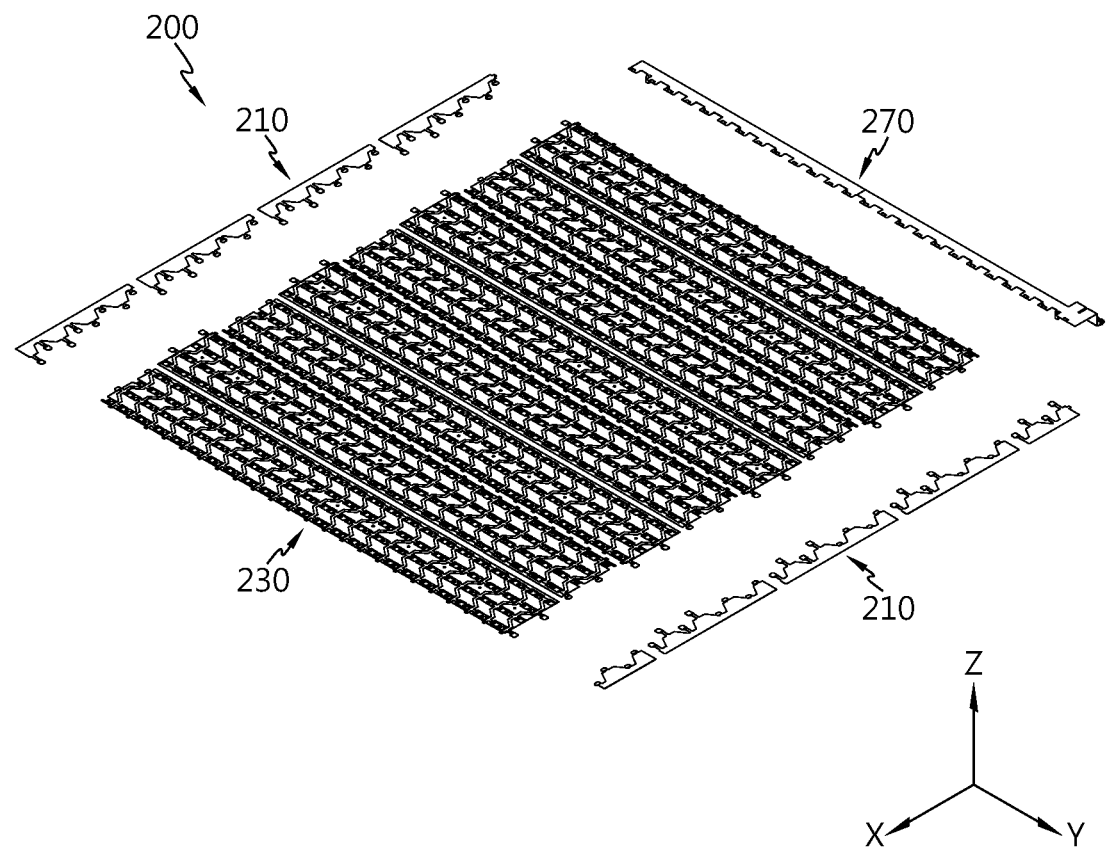
FIG. 8 is a diagram for illustrating a bus bar assembly of the battery pack of FIG. 2.

FIG. 8 is a diagram for illustrating a bus bar assembly of the battery pack of FIG. 2.

Referring to FIG. 8 along with FIG. 2, the bus bar assembly 200 may include a main bus bar unit 210.

The main bus bar unit 210 may be provided in plural, and may be electrically connected to the battery cells 100 disposed at the outermost side in the longitudinal direction (Y-axis direction) of the battery pack P. The main bus bar unit 210 may be electrically connected to the connector terminals 280, 290, explained later.

Figure 9:
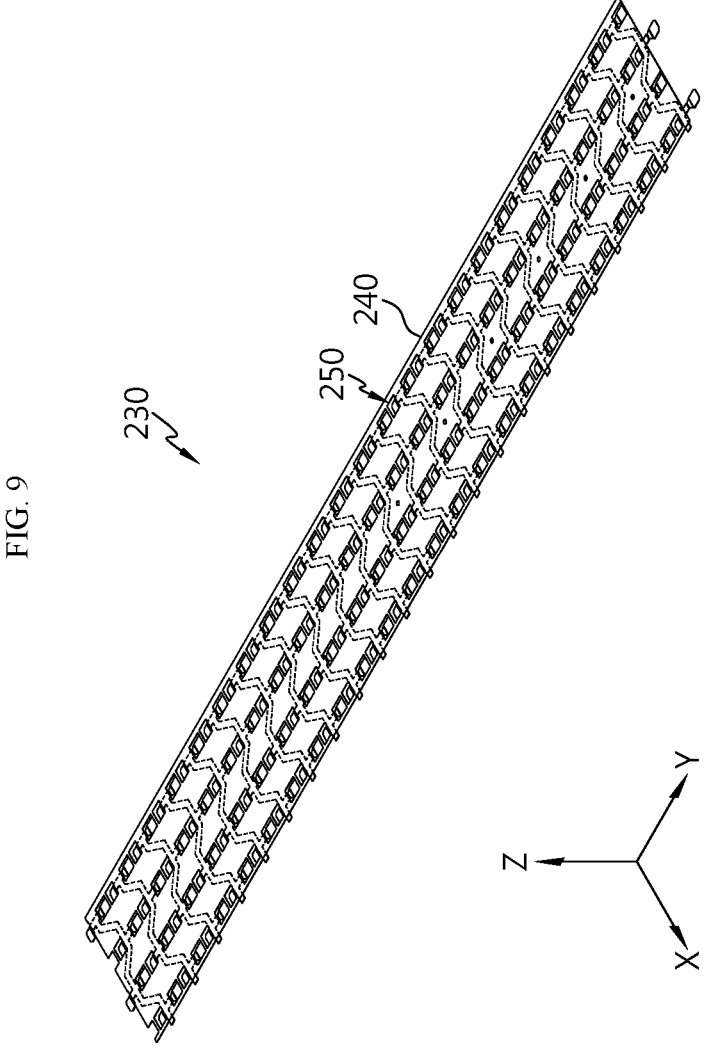
FIG. 9 is a diagram for illustrating a connection bus bar unit of the bus bar assembly of FIG. 8.
Figure 10:
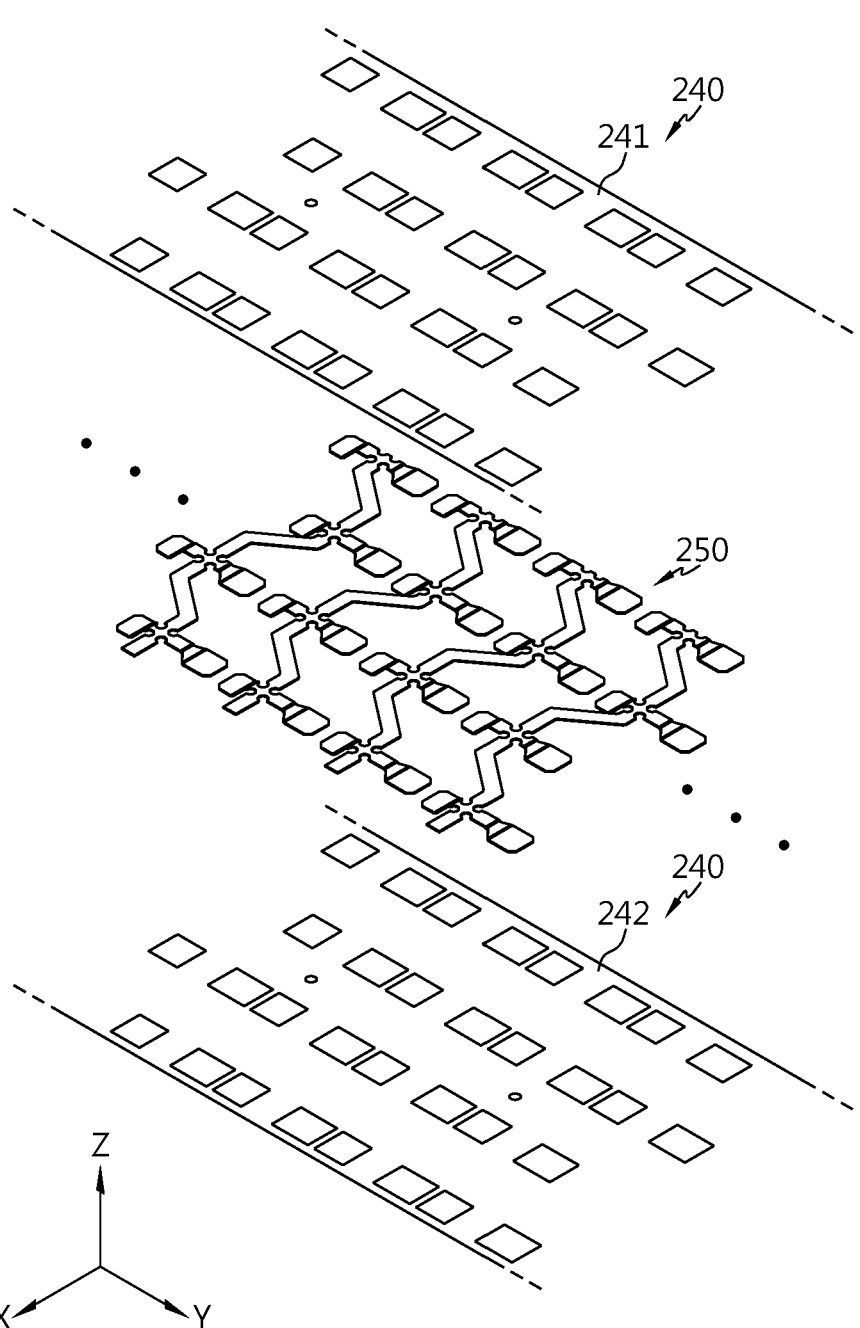
FIG. 10 is an exploded perspective view schematically showing the connection bus bar unit of FIG. 9.
Figure 11:
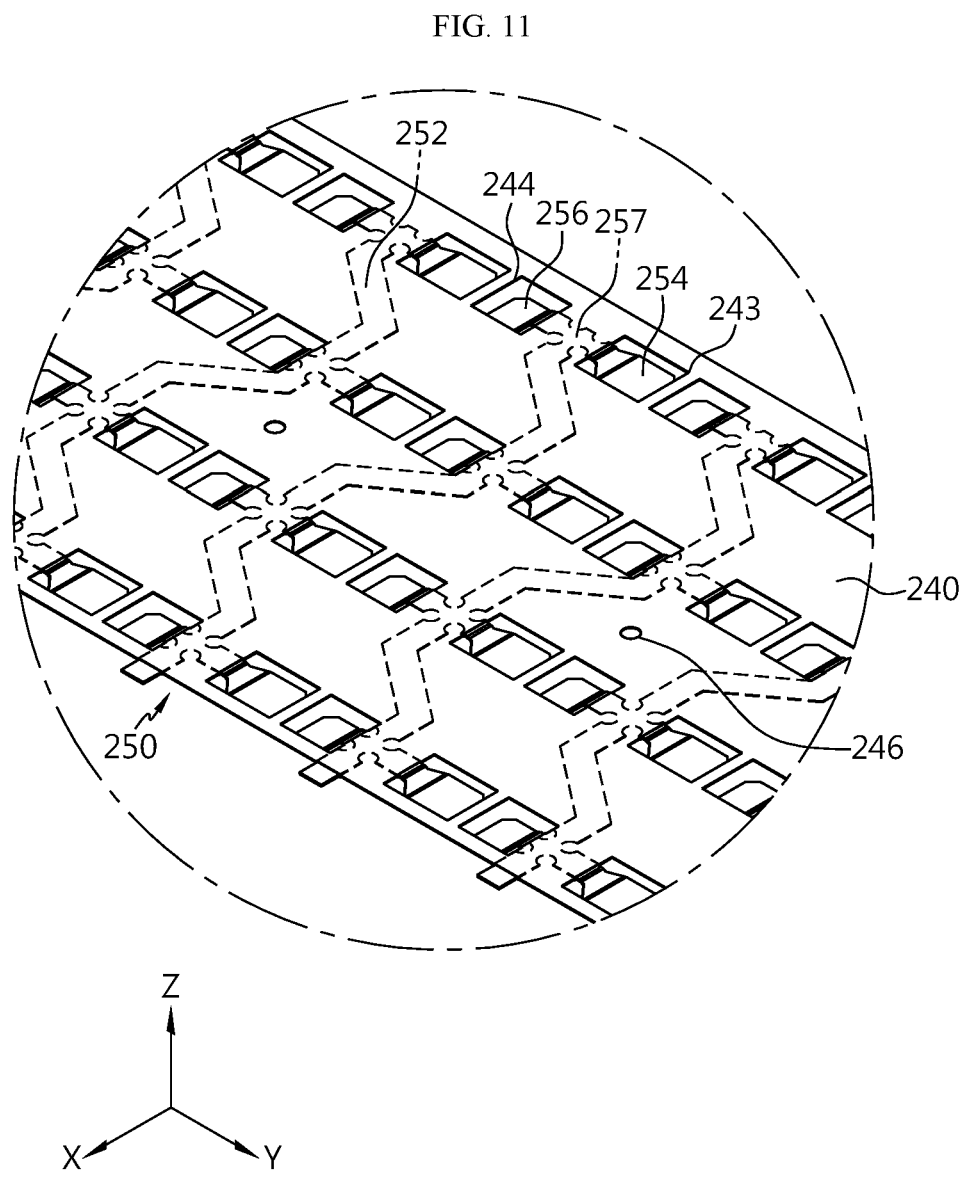
Figure 12:
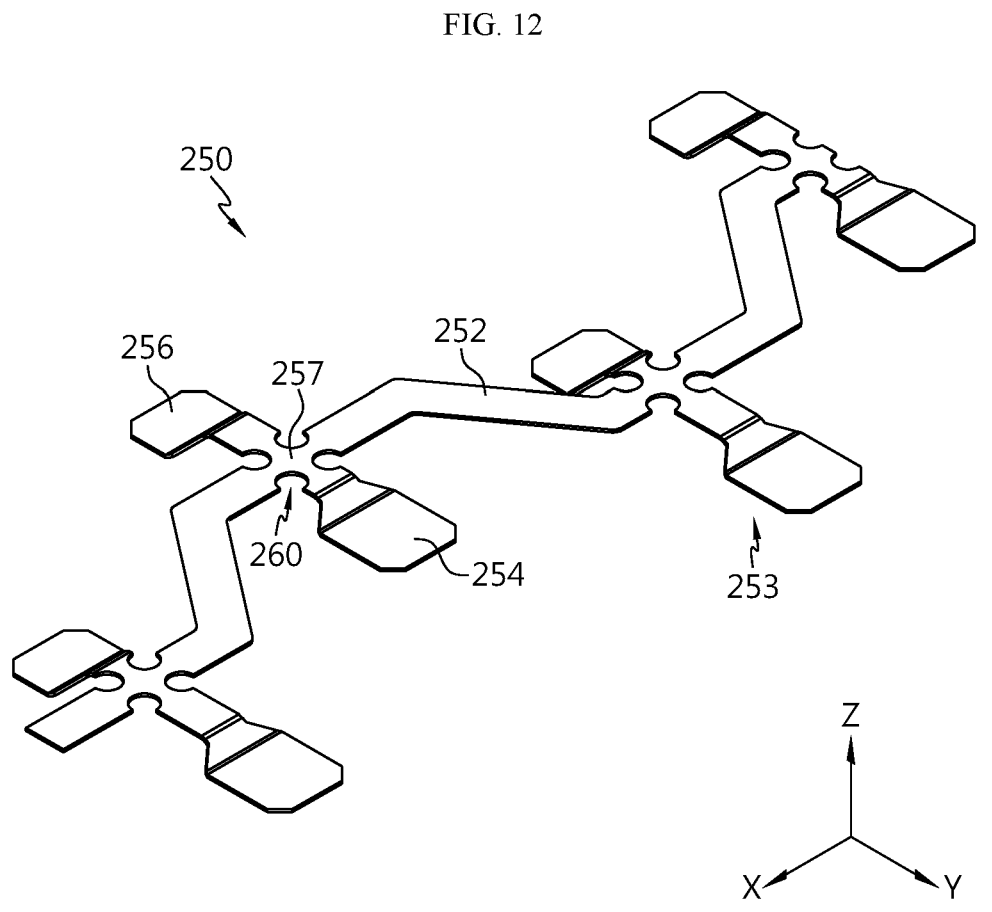
Figure 13:
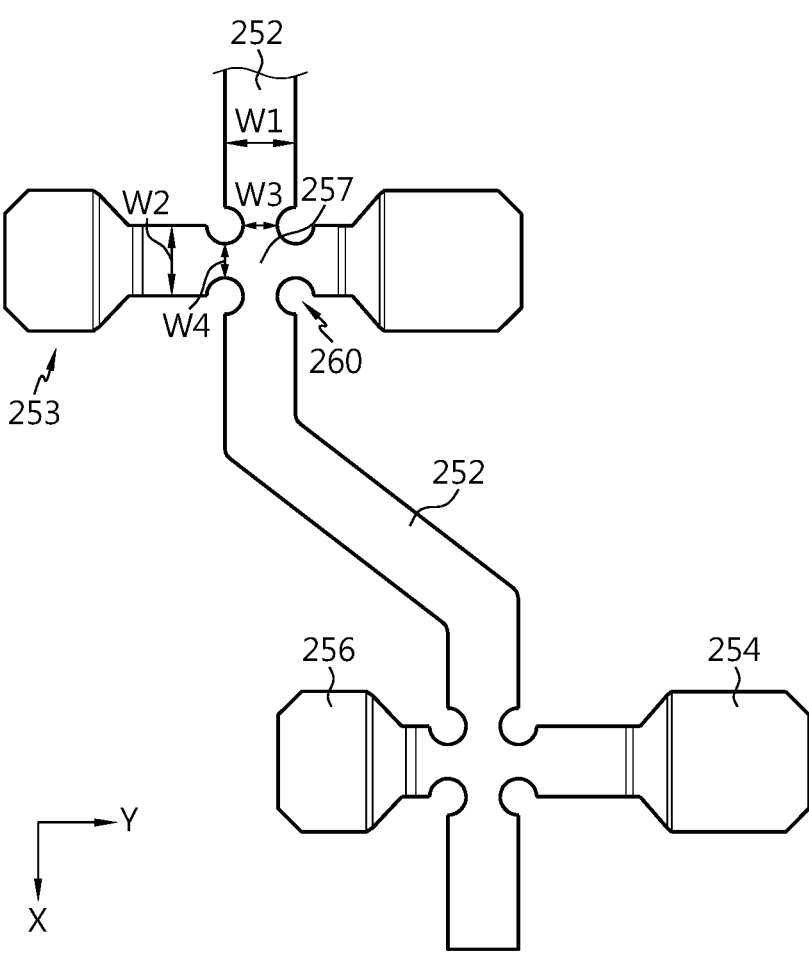
FIG. 13 is a plan view showing a main part of the connection bus bar of FIG. 12.

FIG. 9 is a diagram for illustrating a connection bus bar unit of the bus bar assembly of FIG. 8, FIG. 10 is an exploded perspective view schematically showing the connection bus bar unit of FIG. 9, FIG. 11 is an enlarged view for illustrating a main part of the connection bus bar unit of FIG. 10, FIG. 12 is a diagram for illustrating a connection bus bar unit of the bus bar assembly of FIG. 9, and FIG. 13 is a plan view showing a main part of the connection bus bar of FIG. 12.

Referring to FIGS. 9 to 13 along with FIG. 2, the bus bar assembly 200 may include a connection bus bar unit 230.

The connection bus bar unit 230 may be disposed between the main bus bar units 210 in the longitudinal direction (Y-axis direction) of the battery pack P, may be electrically connected to the plurality of battery cells 100, and may cover the plurality of battery cells 100.

The connection bus bar unit 230 may be provided in a single number having a size capable of covering all of the plurality of battery cells 100 or may be provided in plural to cover the plurality of battery cells 100. Hereinafter, in this embodiment, it will be described that the connection bus bar unit 230 is provided in plural.

Each of the plurality of connection bus bars units 230 may include a bus bar cover 240 and a connection bus bar 250.

The bus bar cover 240 may cover the connection bus 250, explained later. The bus bar cover 240 covers an upper side of the plurality of battery cells 100 and may be provided in an approximately flat plate shape. The shape and size of the bus bar cover 240 may vary depending on the number or capacity of battery cells 100 required in the battery pack P.

The bus bar cover 240 may be made of an insulating material. For example, the bus bar cover 240 may be made of a polyimide film (Pi film). The present invention is not limited thereto, and it is also possible that the bus bar cover 240 is provided as other insulation members made of an insulating material.

The bus bar cover 240 may be provided in a pair to have a shape and size corresponding to each other in the upper and lower direction (Z-axis direction) of the battery pack P, and the pair of bus bar covers 240 may be coupled to each other. Here, the connection bus bar 250, explained later, may be inserted between the pair of bus bar covers 240.

Specifically, the pair of bus bar covers 240 may include a first cover 241 and a second cover 242.

The first cover 241 may cover one side of the connection bus bar 250, explained later. Specifically, the first cover 241 may cover the upper side of the connection bus bar 250, explained later. More specifically, the first cover 241 may cover the upper side of the plurality of connection bus bars 250 integrally.

The second cover 242 may cover the other side of the connection bus bar 250, explained later. Specifically, the second cover 242 may cover the lower side of the connection bus bar 250, explained later. More specifically, the second cover 242 may cover the lower side of the plurality of connection bus bars 250 integrally. The second cover 242 may be coupled to the first cover 241. By coupling the first cover 241 and the second cover 242, the plurality of connection bus bars 250 are disposed between the first cover 241 and the second cover 242, thereby preventing a short circuit and securing safety.

In the bus bar cover 240, a bus bar hole 243, 244 and guide holes 246 may be formed.

The bus bar hole 243, 244 may have an open space of a predetermined size capable of exposing the serial connection portion 253 of the connection bus bar 250, explained later. The bus bar hole 243, 244 may improve the workability of electrical connection such as a welding process between the serial connection portion 253 of the connection bus bar 250, explained later, and the battery cells 100, and increase the injection efficiency of the filling member 500, explained later.

The bus bar hole 243, 244 may be formed to have an open space larger than the size of the serial connection portion 253 so as to further increase workability of the electrical connection and injection efficiency of the filling member 500.

The bus bar hole 243, 244 may be provided in plural.

The plurality of bus bar holes 243, 244 may include a positive electrode bus bar hole 243 and a negative electrode bus bar hole 244.

The positive electrode bus bar hole 243 has an open space of a predetermined size, and may be provided in plural. A positive electrode connection portion 254, explained later, may be exposed in the positive electrode bus bar hole 243. Here, the positive electrode bus bar hole 243 may be formed to have an open space larger than the size of the positive electrode connection portion 254, explained later, in order to improve process workability and to improve the efficiency of injecting the filling member 500, explained later.

The positive electrode bus bar hole 243 may more efficiently guide the electrical connection between the positive electrode connection portion 254, explained later, and the first electrode terminal 40 (see FIG. 3), which is a positive electrode of the battery cells 100.

Moreover, through the open space of the positive electrode bus bar hole 243, it is possible to significantly increase the injection efficiency of the filling member 500 when the filling member 500, explained later, is injected. Specifically, the filling member 500 provided as a potting resin 500, explained later, through the open space of the positive electrode bus bar hole 243 may be more directly injected in the vertical direction (Z-axis direction) from the upper side of the battery pack P to the lower side thereof, so the injection efficiency between the battery cells 100 may be significantly improved.

The negative electrode bus bar hole 244 is disposed to face the positive electrode bus bar hole 243, has an open space of a predetermined size like the positive electrode bus bar hole 243, and may be provided in plural. Here, the negative electrode bus bar hole 244 may be formed to have an open space larger than the size of the negative electrode connection portion 256, explained later, in order to improve process workability and to improve injection efficiency of the filling member 500, explained later.

The negative electrode bus bar hole 244 may more efficiently guide the electrical connection between the negative electrode connection portion 256, explained later, and the second electrode terminal 20*a* (see FIG. 3) serving as the negative electrode of the battery cells 100.

Moreover, through the open space of the negative electrode bus bar hole 244, it is possible to significantly increase the injection efficiency of the filling member 500 when the filling member 500, explained later, is injected. Specifically, since the filling member 500 provided as the potting resin 500, explained later, may be more directly injected through the open space of the negative electrode bus bar hole 244 in the vertical direction (Z-axis direction) from the upper side of the battery pack P to the lower side, the injection efficiency between the battery cells 100 may be significantly improved.

The guide hole 246 may guide the assembling location of the bus bar assembly 200. Specifically, the guide hole 246 may guide the correct arrangement of the connection bus bar unit 230 by fixing the connection bus bar unit 230 to the side structure unit 400.

The guide hole 246 may be provided in plural. Bus bar guide protrusions 416 of the side structure unit 400, explained later, may be inserted into the plurality of guide holes 246.

The connection bus bar 250 may be connected in series and in parallel to adjacent battery cells 100 in the longitudinal direction (Y-axis direction) and the width direction (X-axis direction). The connection bus bar may be provided in plural to connect the plurality of battery cells 100.

The connection bus bar 250 may be provided in a strip shape having a predetermined length and width, and may be provided as a single layer. Here, the strip shape may be formed to correspond to the arrangement structure of the plurality of battery cells 100. For example, the strip shape may be provided in a cross shape, an oblique shape, or a zigzag shape according to the arrangement structure of the battery cells 100.

The connection bus bar 250 may be provided to the upper side of the bus bar cover 240 or be inserted into the pair of bus bar covers 240. Hereinafter, in this embodiment, it will be described that the connection bus bar 250 is inserted into the pair of bus bar covers 250 as above.

The connection bus bar 250 may be provided in plural. The plurality of connection bus bars 250 may be inserted into the bus bar cover 240 and disposed to be spaced apart from each other by a predetermined distance in the longitudinal direction (Y-axis direction) of the battery pack P.

The plurality of connection bus bars 250 may include a parallel connection portion 252, a serial connection portion 253, and an interconnection portion 257.

The parallel connection portion 252 is configured to connect the battery cells 100 in parallel, and may be formed along any one of the longitudinal direction (Y-axis direction) and the width direction (X-axis direction) of the battery pack P. Specifically, the parallel connection portion 252 may be formed along any one of the longitudinal direction (Y-axis direction) and the width direction (X-axis direction) of the bus bar assembly 200. Hereinafter, in this embodiment, it will be described that the parallel connection portion 252 is formed along the width direction of the battery pack P, namely the width direction (X-axis direction) of the bus bar assembly 200.

The parallel connection portion 252 may be inserted into the bus bar cover 240 and formed to have a predetermined length along the width direction (X-axis direction) of the battery pack P. The parallel connection portion 252 may be provided in a shape corresponding to the arrangement structure of the battery cells 100 in the width direction (X-axis direction) of the battery pack P to increase the efficiency of electrical connection with the battery cells 100. Accordingly, in this embodiment, the parallel connection portion 252 may be arranged in a zigzag shape in the width direction (X-axis direction) of the battery pack P.

The parallel connection portion 252 may be made of a conductive material. For example, the parallel connection portion 252 may be made of aluminum or copper as a metal material. The present disclosure is not limited thereto, and of course, the parallel connection portion 252 may be made of other materials for the electrical connection.

The serial connection portion 253 is configured to connect the battery cells 100 in series, and may be formed along the other one of the longitudinal direction (Y-axis direction) and the width direction (X-axis direction) of the battery pack P. Specifically, the serial connection portion 253 may be formed along the other one of the longitudinal direction (Y-axis direction) and the width direction (X-axis direction) of the bus bar assembly 200. Hereinafter, in this embodiment, it will be described that the serial connection portion 253 is formed along the longitudinal direction of the battery pack P, namely the longitudinal direction (Y-axis direction) of the bus bar assembly 200.

The serial connection portion 253 may include a positive electrode connection portion 254 and a negative electrode connection portion 256.

The positive electrode connection portion 254 extends to protrude by a predetermined length from the interconnection portion 257, explained later, and may be disposed in the positive electrode bus bar hole 242. The positive electrode connection portion 254 may be electrically connected to the positive electrode 40 (see FIG. 3) of the battery cell 100. The electrical connection may be performed through a welding process for electrical connection such as laser welding or ultrasonic welding.

Since the positive electrode connection portion 254 and the positive electrode 40 of the battery cell 100 are connected in the open space of the positive electrode bus bar hole 242, the welding process for the connection may be carried out directly in the open space during the connection without any further process.

The negative electrode connection portion 256 may be provided at a side opposite to the positive electrode connection portion 254, extend from the interconnection portion 257 to protrude by a predetermined length, and be disposed in the negative electrode bus bar hole 244. The negative electrode connection portion 256 may be electrically connected to the negative electrode 20*a* (see FIG. 3) of the battery cell 100. The electrical connection may be performed through a welding process for electrical connection such as laser welding or ultrasonic welding.

Since the negative electrode connection portion 256 and the negative electrode 20*a* of the battery cell 100 are connected in the open space of the negative electrode bus bar hole 244, the welding process for the connection may be carried out directly in the open space during the connection without any further process.

In this way, the positive electrodes 40 and the negative electrodes 20*a* of the plurality of battery cells 100 may be electrically connected to the positive electrode connection portion 254 and the negative electrode connection portion 256 integrally provided to the single-layered connection bus bar 250 included in the bus bar assembly 200.

The interconnection portion 257 may connect the parallel connection portion 252 and the serial connection portion 253 to each other. The interconnection portion 257 may be integrally formed with the parallel connection portion 252 and the serial connection portion 253 to configure the connection bus bar 250 provided as a single layer.

Each of the plurality of connection bus bars units 230 may include a fusing portion 260.

The fusing portion 260 is formed in the connection bus bar 250, and may be configured to block the electrical connection of the battery cell 100 in which an abnormal situation occurs in both serial connection direction and parallel connection direction. The fusing portion 260 may be configured to physically separate at least a part of the connection bus bar 250 in the event of the abnormal situation.

The fusing portion 260 may be integrally formed in the connection bus bar 250. Specifically, the fusing portion 260 may be integrally formed in the interconnection portion 257.

The fusing portion 260 may be configured to reduce the width of the interconnection portion 257. This is because, in a region where resistance is relatively large (a region where a cross-sectional area through which current flows is narrow), heat is generated relatively large, so the time of thermally cutting a material is faster than in other regions. To this end, the fusing portion 260 may be formed to be recessed by a predetermined depth from the interconnection portion 257. Here, the fusing portion 260 may be formed at each corner of the edge of the interconnection portion 257.

In this embodiment, due to the fusing portion 260, in the interconnection portion 257, the width (W3) of the interconnection portion 257 between the interconnection portion 257 and the parallel connection portion 252 may be smaller than the width (W1) of the parallel connection portion 252. In addition, in this embodiment, due to the fusing portion 260, in the interconnection portion 257, the width (W4) of the interconnection portion 257 between the interconnection portion 257 and the series connection portion 253 may be smaller than the width (W2) of the series connection portion 253. That is, the fusing portion 260 may form a bus bar neck having a relatively small thickness in the serial connection direction. After all, in this embodiment, due to the fusing portion 260, the width of both the series connection portion and the parallel connection portion of the interconnection portion 257 may be reduced.

Figure 14:
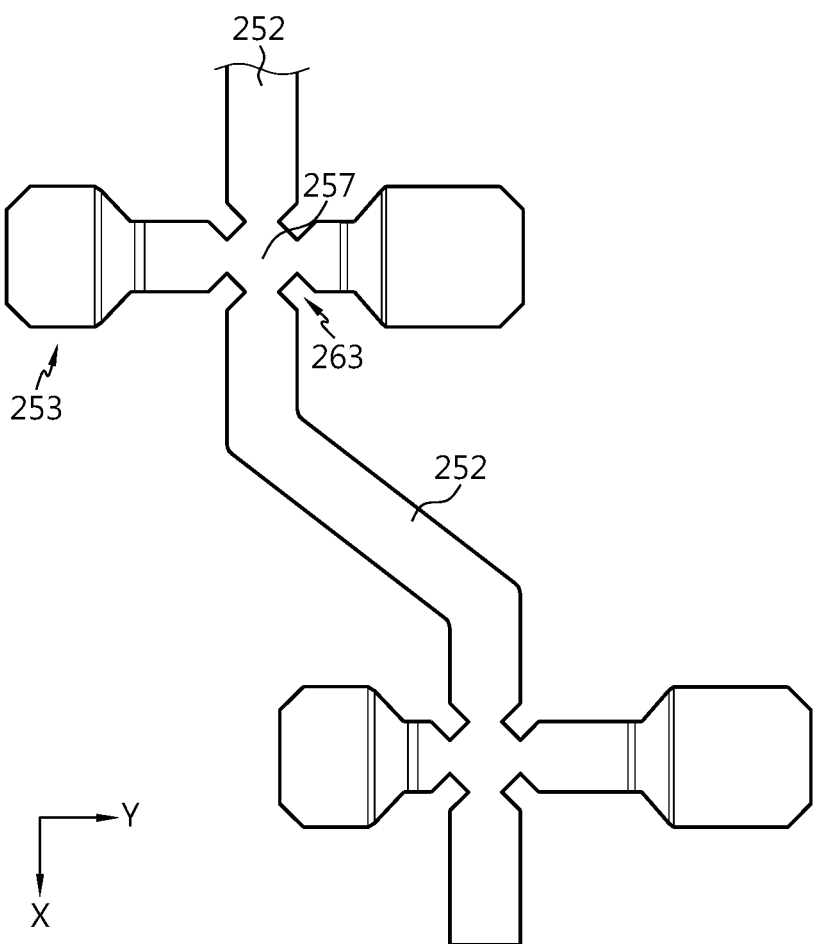
FIG. 14 is a diagram for illustrating a fusing portion according to another embodiment of the connection bus bar of FIG. 13.
Figure 15:
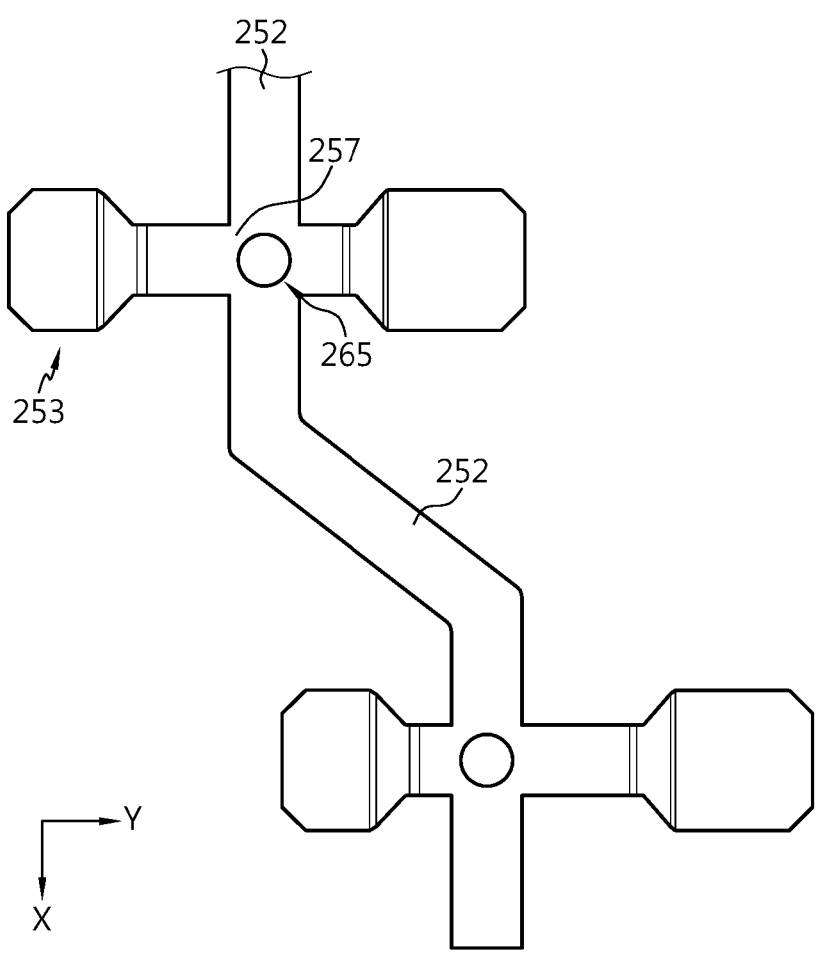
FIG. 15 is a diagram for illustrating a fusing portion according to still another embodiment of the connection bus bar of FIG. 13.

FIG. 14 is a diagram for illustrating a fusing portion according to another embodiment of the connection bus bar of FIG. 13, and FIG. 15 is a diagram for illustrating a fusing portion according to still another embodiment of the connection bus bar of FIG. 13.

Referring to FIG. 14, the fusing portion 263 may be provided in an angled shape rather than a round shape as in FIG. 13. Also, referring to FIG. 15, the fusing portion 265 may be formed in a hole shape of a predetermined size capable of reducing the width of the edge of the interconnection portion 257 inside the interconnection portion 257. As such, the fusing portion 263, 265 may have various shapes and arrangements capable of reducing the width of the interconnection portion 257 that connects the parallel connection portion 252 and the series connection portion 253. In addition, the fusing portion may also be provided in a semicircular shape, a notch shape, a groove shape, a circular shape, or the like, which may reduce the width of the interconnection portion 257.

Hereinafter, the electrical connection structure of the battery cells 100 through the connection bus bar 250 will be described in more detail. Meanwhile, in FIGS. 16 to 20 as described below, the bus bar cover 240 for covering the connection bus bar 250, and the cooling unit 300 and the side structure unit 400 disposed between the battery cells 100, explained later, are not depicted to more clearly show the connection structure of the connection bus bar 250.

Figure 16:
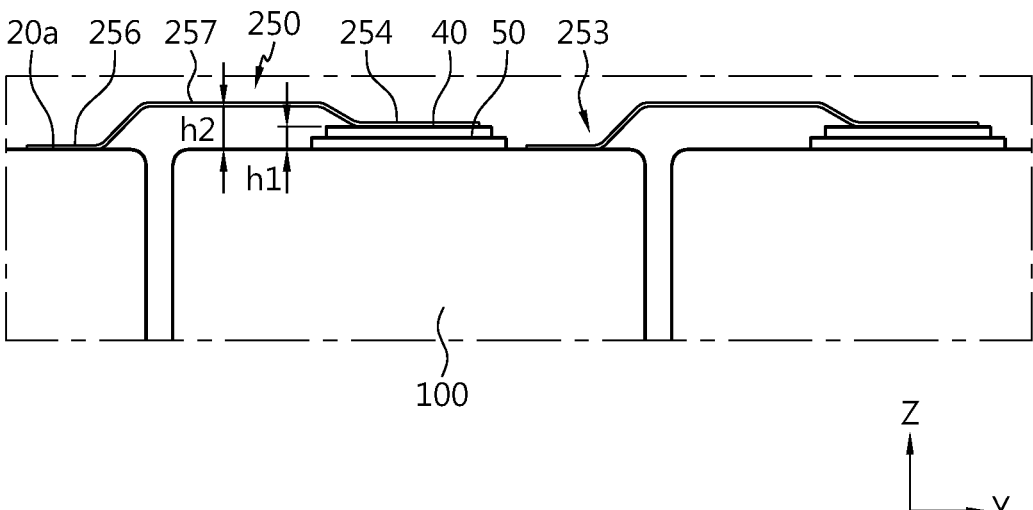
FIG. 16 is a diagram for illustrating the connection of positive electrodes and negative electrodes of battery cells through the connection bus bar of FIG. 12.
Figure 17:
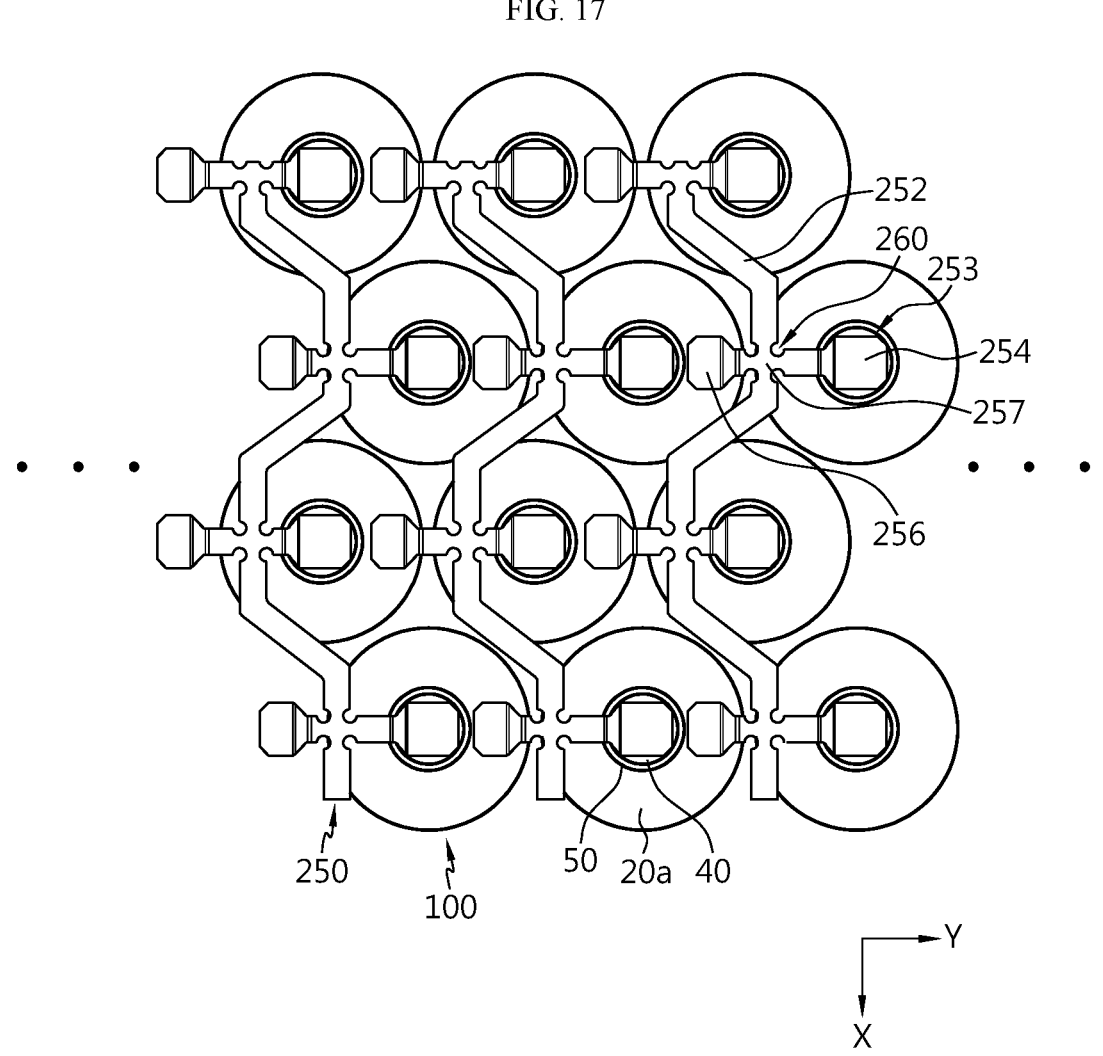
FIG. 17 is a diagram for illustrating the electrical connection of the battery cells through the connection bus bar of FIG. 12.

FIG. 16 is a diagram for illustrating the connection of positive electrodes and negative electrodes of battery cells through the connection bus bar of FIG. 12, and FIG. 17 is a diagram for illustrating the electrical connection of the battery cells through the connection bus bar of FIG. 12. As mentioned above, in FIGS. 16 and 17, for convenience of explanation, the bus bar cover 240 for covering the connection bus bar 250, and the cooling unit 300 and the side structure unit 400 disposed between the battery cells 100 are not depicted.

Referring to FIGS. 16 and 17, when the battery cells 100 and the connection bus bar 250 are electrically connected, in the height direction (Z-axis direction) of the bus bar assembly 200 (see FIG. 2), the height h1 between the positive electrode connection portion 254 and the negative electrode connection portion 256 may be identical to the protrusion height of the positive electrode 40 on one surface of the battery cell 100.

Accordingly, when a worker or the like places the connection bus bar 250 on one side of the battery cells 100, specifically on the upper side (+Z-axis direction) of the battery cells 100, the positive electrode connection portion 254 and the negative electrode connection portion 256 of the connection bus bar 250 may be stably in close contact with the positive electrode 40 and the negative electrode 20a of the battery cells 100.

In addition, since the positive electrode connection portion 254 and the negative electrode connection portion 256 of the connection bus bar 250 may secure the contact area with the positive electrode 40 and the negative electrode 20a of the battery cells 100 to the maximum, when a welding process or the like is performed later for electrical connection, it is possible to significantly improve the welding accuracy while preventing poor welding quality.

Meanwhile, in the height direction (Z-axis direction) of the bus bar assembly 200, the height h2 of the interconnection portion 257 may be greater than the height of the positive electrode connection portion 254 and the negative electrode connection portion 256. Accordingly, the interconnection portion 257 may be disposed to be sufficiently spaced apart from the positive electrode 40 and the negative electrode 20a of the battery cells 100, thereby further enhancing the electrical safety.

Figure 18:
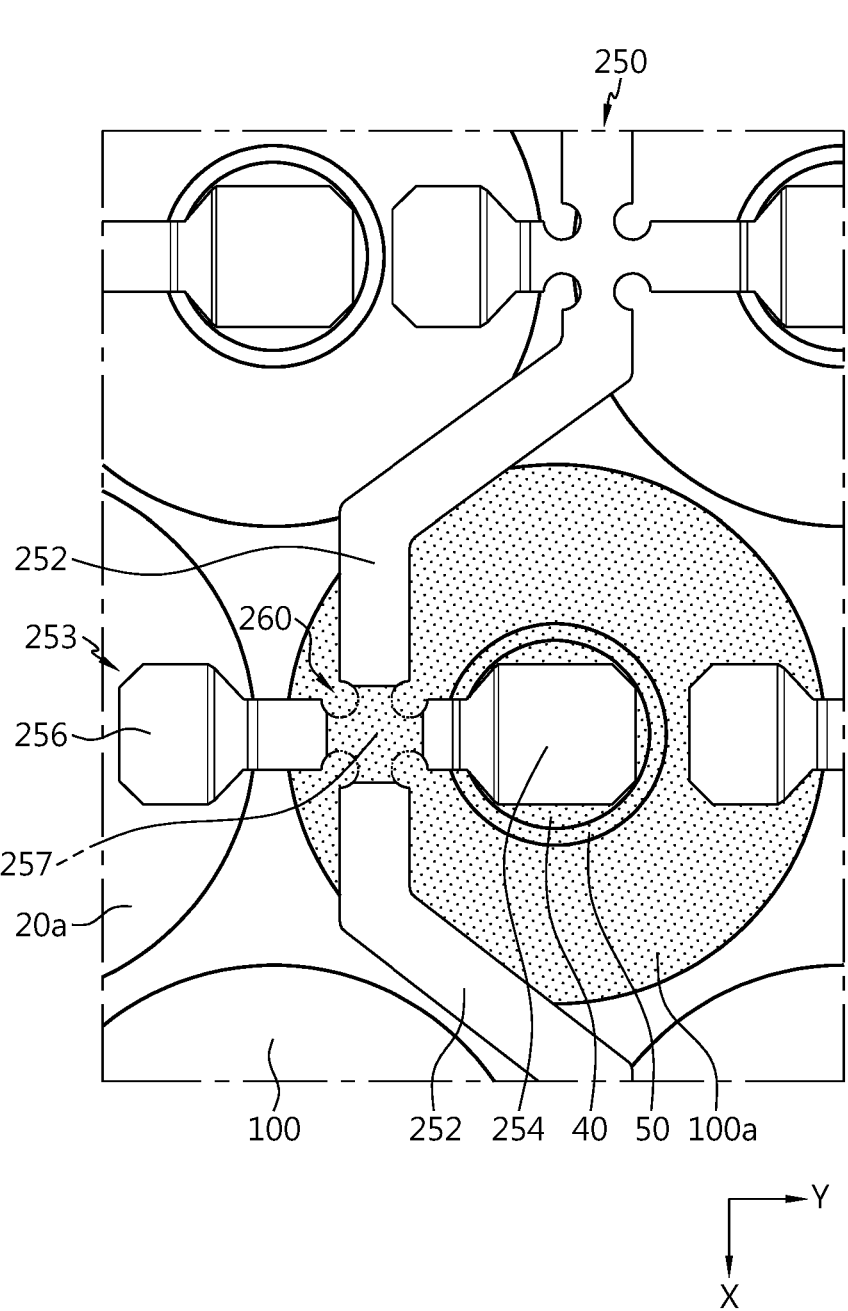
FIGS. 18 to 20 are diagrams for illustrating an electrical connection blocking mechanism through the fusing portion according to an embodiment of the present disclosure.
Figure 19:
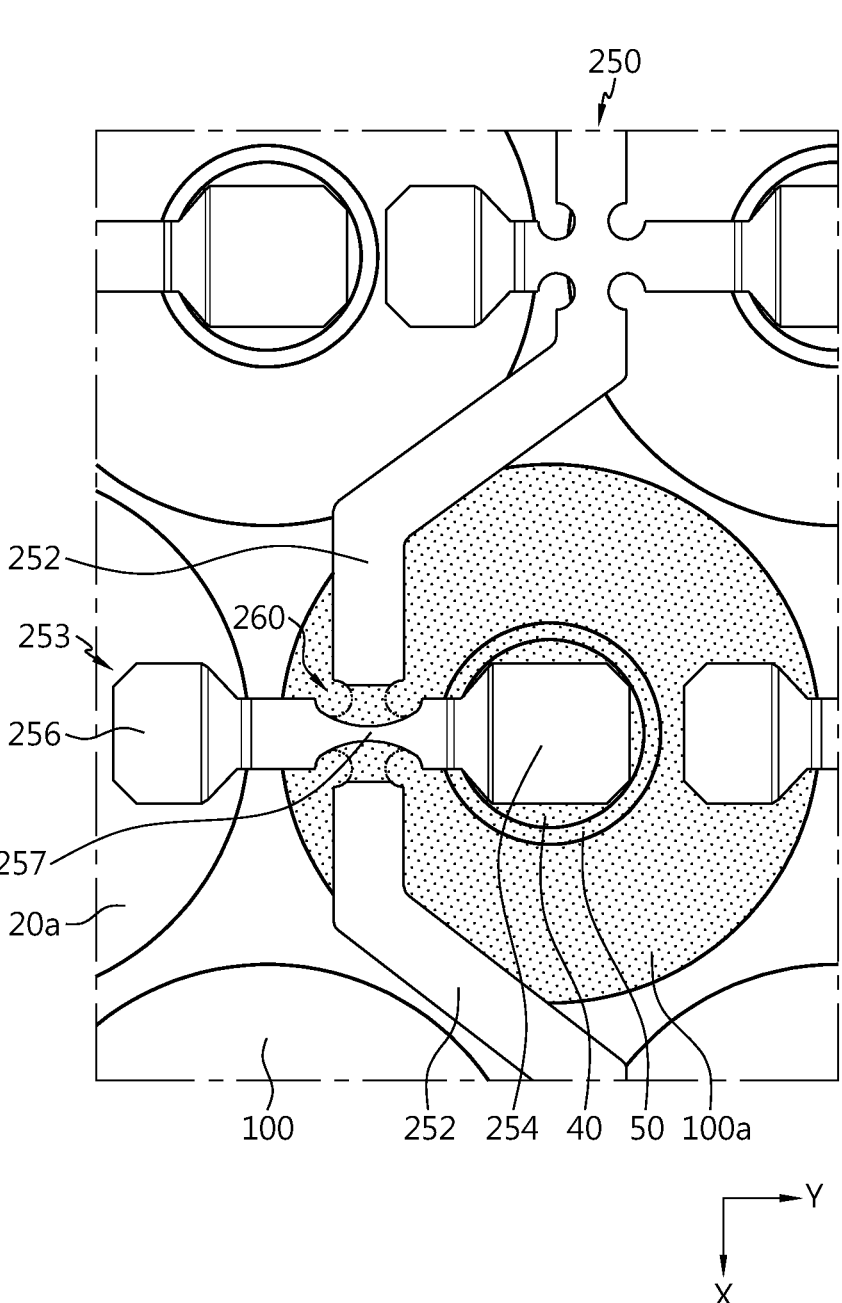
Figure 20:
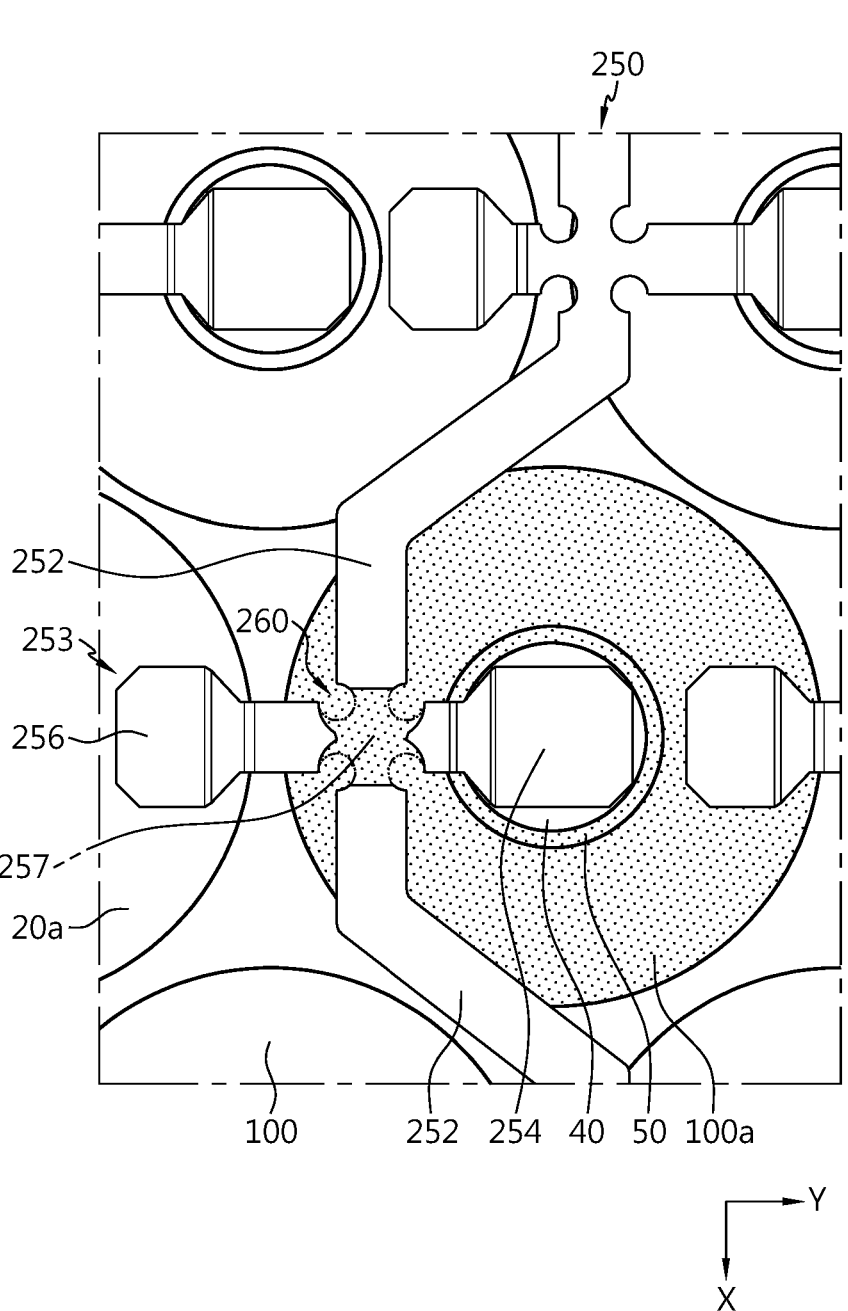

FIGS. 18 to 20 are diagrams for illustrating an electrical connection blocking mechanism through the fusing portion according to an embodiment of the present disclosure. As mentioned above, also in FIGS. 18 to 20, for convenience of explanation, the bus bar cover 240 for covering the connection bus bar 250, and the cooling unit 300 and the side structure unit 400 disposed between the battery cells 100 are not depicted.

Referring to FIGS. 18 to 20, when an abnormal situation occurs in any battery cell 100a among the battery cells 100, the fusing portion 260 may block the electrical connection of the battery cell 100a in which the abnormal situation occurs in both serial and parallel connection directions.

As described above, since the fusing portion 260 is formed to reduce the width of the interconnection portion 257 that connects the parallel connection portion 252 and the series connection portion 253, when a high current is applied to the connection bus bar 250 due to the battery cell 100a in which an abnormal situation occurs, the interconnection portion 257 connected to the battery cell 100a in which the abnormal situation occurs may be fused off relatively first.

Since the fusing portion 260 is formed to reduce the widths of both sides of the interconnection portion 257 connected to the parallel connection portion 252 and the series connection portion 253, when the abnormal situation occurs, the connection to both the parallel connection portion 252 and the series connection portion 254 may be cut off. In other words, the fusing portion 260 may block the parallel connection and the series connection in the region of the interconnection portion 257 connected to the parallel connection portion 252 and the series connection portion 253. After all, when the abnormal situation occurs, both the series connection and the parallel connection may be blocked through the fusing portion 260 in the same area.

As such, in this embodiment, when an abnormal situation occurs, the fusing portion 260 may block both the series and parallel connections of the battery cell 100a in which the abnormal situation occurs, so that the battery cell 100a in the abnormal situation occurs may be completely separated from the other battery cells 100.

Therefore, in this embodiment, when the abnormal situation occurs, it is possible to more quickly prevent chain damage to other battery cells 100 around the battery cell 100a in which the abnormal situation occurs.

Moreover, since the interconnection portion 257 in which the fusing portion 260 is formed according to this embodiment is disposed to be spaced apart from the battery cells 100 by a predetermined distance, when the fusing portion 260 is heated, damage to the battery cells 100 may be minimized to secure safety the battery cells 100 as much as possible.

Meanwhile, the fusing portion 260 may be configured to sequentially block the electrical connections of the parallel connection portion 252 and the serial connection portion 253 connected to the battery cell 100a in which the abnormal situation occurs.

When the abnormal situation occurs, as shown in FIG. 19, first, the fusing portion 260 may cut off the connection portion with the parallel connection portion 252 of the interconnection portion 257 by fusing, and then, as shown in FIG. 20, the connection portion with the series connection portion 253 of the interconnection portion 257 may be cut off by fusing. The sequential fusing of the interconnection portion 257 with the parallel connection portion 252 and the serial connection portion 253 may be performed along the current path, so that the connection portion to the serial connection portion 253 side is cut off first and then the connection portion to the parallel connection portion 252 side is cut off. In addition, depending on the current path, it may also be possible that the serial connection portion 253 and the parallel connection portion 252 are simultaneously cut off.

When the abnormal situation occurs, since the series connection and the parallel connection are sequentially blocked through the fusing portion 260 in the same region, namely the interconnection portion 257, the effect of heat in the fusing portion 260 toward the battery cells 100 may be minimized.

Referring to FIG. 2 again, the bus bar assembly 200 may include a sensing interconnection board 270 and a connector terminal 280, 290.

The sensing interconnection board 270 is connected to the external sensing line and may be provided at one end (−Y-axis direction) of the battery pack P. The arrangement position of the sensing interconnection board 270 may be changed according to design or the like, and the sensing interconnection board 270 may be provided at other positions capable of enabling connection with the external sensing line. Moreover, it may be possible that the sensing interconnection board 270 is provided in plural according to the number or capacity of the battery cells 100 of the battery pack P.

The sensing interconnection board 270 may be provided to be exposed to the outside of the battery pack 10 for connection with the external sensing line. The external sensing line may connect the sensing interconnection board 270 and a battery management system (not shown). The battery management system may determine the state of charge of the battery cells based on the voltage of the battery cells.

The sensing interconnection board 270 may include a thermistor for checking the temperature state of the battery cells 100. The thermistor may be included in the sensing interconnection board 270 or may be separately mounted outside the sensing interconnection board 270.

The connector terminals 280, 290 may be provided as a pair. The pair of connector terminals 280, 290 are for connection with an external charging/discharging line, and may be provided as high voltage connector terminals.

Referring to FIG. 2 again, the battery pack P may include a cooling unit 300.

The cooling unit 300 is for cooling the battery cells 100, and is disposed at the lower side (−Z-axis direction) of the bus bar assembly 200, and may be disposed between the plurality of battery cells 100 along the longitudinal direction (Y-axis direction) of the battery pack P.

The cooling unit 300 may be provided in plural.

The plurality of cooling units 300 may be disposed to face the plurality of battery cells 100 in the width direction (X-axis direction) of the battery pack P. Here, the plurality of cooling units 300 may be disposed to contact the battery cells 100 facing each other to increase cooling performance.

Hereinafter, the cooling unit 300 will be described in more detail.

Figure 21:
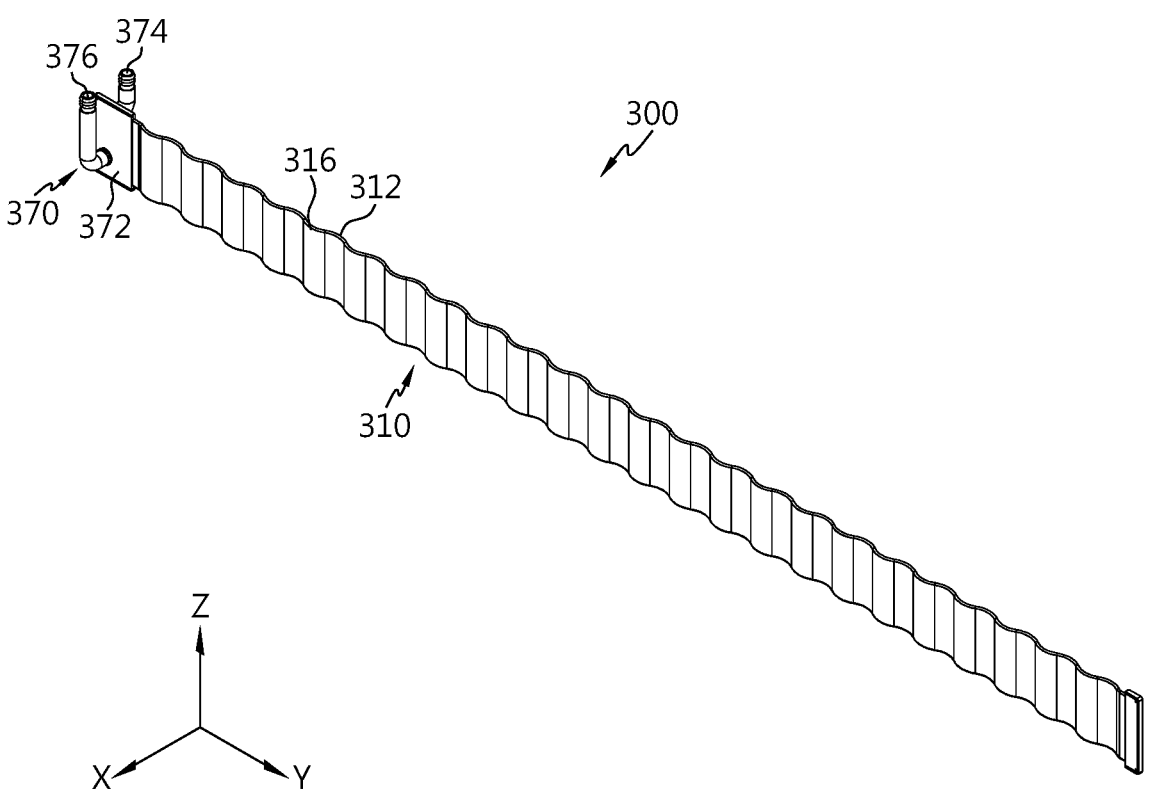
FIG. 21 is a diagram for illustrating a cooling unit of the battery pack of FIG. 2.
Figure 22:
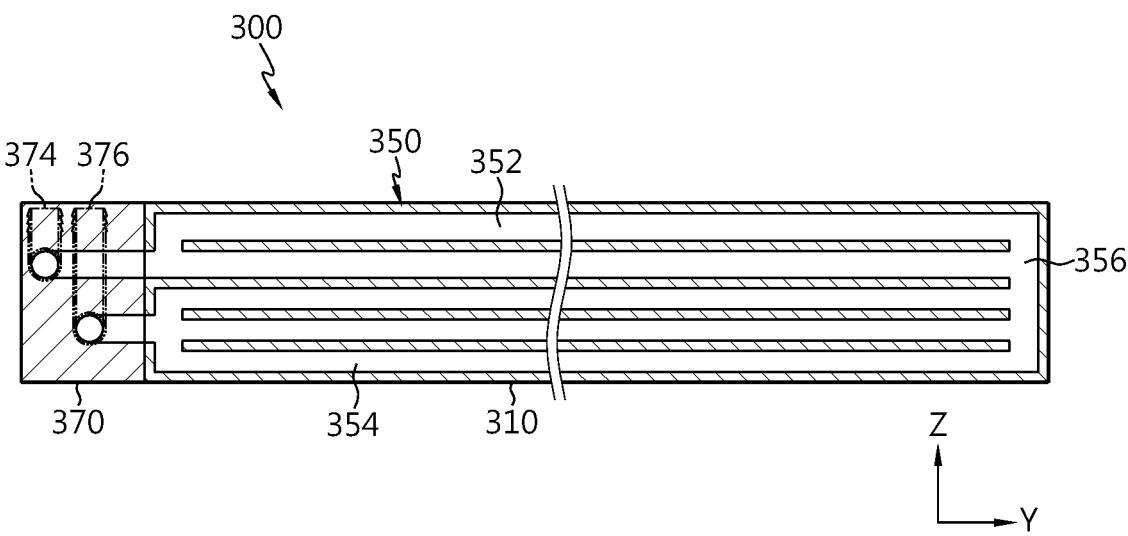
FIG. 22 is a sectional view showing the cooling unit of FIG. 21.

FIG. 21 is a diagram for illustrating a cooling unit of the battery pack of FIG. 2, and FIG. 22 is a sectional view showing the cooling unit of FIG. 21.

Referring to FIGS. 21 and 22 along with FIG. 2, the cooling unit 300 may include a cooling tube 310, a cooling channel 350, and a cooling water inlet/outlet portion 370.

The cooling tube 310 is formed in a predetermined length along the longitudinal direction (Y-axis direction) of the battery pack P, is disposed between the plurality of battery cells 100, and may have a cooling channel 350 for circulation of a cooling water, explained later.

The cooling tube 310 may be formed in a shape corresponding to the outer surface of the plurality of battery cells 100 facing each other in the width direction (X-axis direction) of the battery pack P.

The cooling tube 310 has a plurality of convex portions 312 and concave portions 316 that are convex and concave in the width direction (X-axis direction) of the battery pack P to be alternately arranged along the longitudinal direction (Y-axis direction) of the battery pack P.

The cooling tube 310 may be disposed in contact with the outer surface of the plurality of battery cells 100 to further increase the cooling performance of the battery cells 100. The cooling tube 310 may be adhesively fixed to the plurality of battery cells 100 through the filling member 500, explained later, or a separate adhesive member.

The cooling channel 350 circulates the cooling water for cooling the battery cells 100, is provided in the cooling tube 310, and may be connected in communication with the cooling water inlet/outlet portion 370, explained later.

The cooling channel 350 may include an upper channel 352, a lower channel 354, and a connection channel 356.

The upper channel 352 is disposed at the upper side of the cooling tube 310 to be provided close to the bus bar assembly 200, and may be formed in a predetermined length along the longitudinal direction (Y-axis direction) of the cooling tube 310. The upper channel 352 may be connected in communication with a cooling water supply port 374 of the cooling water inlet/outlet portion 370.

One upper channel 352 or a plurality of upper channels 352 may be provided. Hereinafter, in this embodiment, in order to secure cooling performance, it will be described that the upper channel 352 is provided in plural.

The lower channel 354 is disposed at the lower side (−Z-axis direction) of the cooling tube 310 to be spaced apart from the at least one upper channel 352, and may be formed in a predetermined length along the longitudinal direction (Y-axis direction) of the cooling tube 310. The lower channel 354 may be connected in communication with a cooling water discharge port 376 of the cooling water inlet/outlet portion 370.

One lower channel 354 or a plurality of lower channels 354 may be provided. Hereinafter, in this embodiment, in order to secure cooling performance, it will be described that the lower channel 354 is provided in plural.

The connection channel 356 may connect the at least one upper channel, or a plurality of upper channels 352 in this embodiment, and the at least one lower channel, or a plurality of lower channels 354 in this embodiment.

The connection channel 356 may be provided at the other end (+Y-axis direction) of the cooling tube 310 opposite to the cooling water inlet/outlet portion 370 so as to secure the cooling channel 350 as much as possible.

In this embodiment, when the cooling water of the cooling channel 350 is circulated, the cooling water supplied from the cooling water supply port 374 is preferentially supplied to the upper channel 352 disposed close to the bus bar assembly 200, and then may flow toward the cooling water discharge port 376 via the connection channel 356 and the lower channel 354.

Accordingly, in this embodiment, since a cold cooling water is preferentially supplied to the area near the bus bar assembly 200, which has a relatively higher temperature distribution, within the battery pack P, the cooling performance of the battery cells 100 will be significantly improved.

The cooling water inlet/outlet portion 370 may be connected to the cooling tube 310 to communicate with the cooling channel 350 of the cooling tube 310. The cooling water inlet/outlet portion 370 may be exposed to the outside of the side structure unit 400, explained later, and connected to communicate with an external cooling line.

The cooling water inlet/outlet portion 370 may be provided at one side (−Y-axis direction) of the side surface of the battery pack P in the longitudinal direction (Y-axis direction). The cooling tube 310 connected to the cooling water inlet/outlet portion 370 may be formed in a predetermined length toward the other side (+Y-axis direction) of the side surface of the battery pack P in the longitudinal direction (Y-axis direction) of the battery pack P from the cooling water inlet/outlet portion 370.

The cooling water inlet/outlet portion 370 may include an inlet/outlet portion body 372, a cooling water supply port 374, and a cooling water discharge port 376.

The inlet/outlet portion body 372 may be connected to one end (−Y-axis direction) of the cooling tube 310. The cooling water supply port 374 is provided to the inlet/outlet portion body 372, and may be connected in communication with the upper channel 352. The cooling water supply port 374 may be connected in communication with the external cooling line. The cooling water discharge port 376 is provided to the inlet/outlet portion body 372, and may be connected in communication with the lower channel 374. The cooling water discharge port 376 is disposed to be spaced apart from the cooling water supply port 374 by a predetermined distance, and may be connected in communication with the external cooling line.

Referring to FIG. 2 again, the battery pack P may include a side structure unit 400.

The side structure unit 400 may be made of a plastic resin material, support the battery cells 100, secure rigidity of the battery cells 100, and form a side appearance of the battery pack P.

Hereinafter, the side structure unit 400 will be described in more detail with reference to the related drawings.

Figure 23:
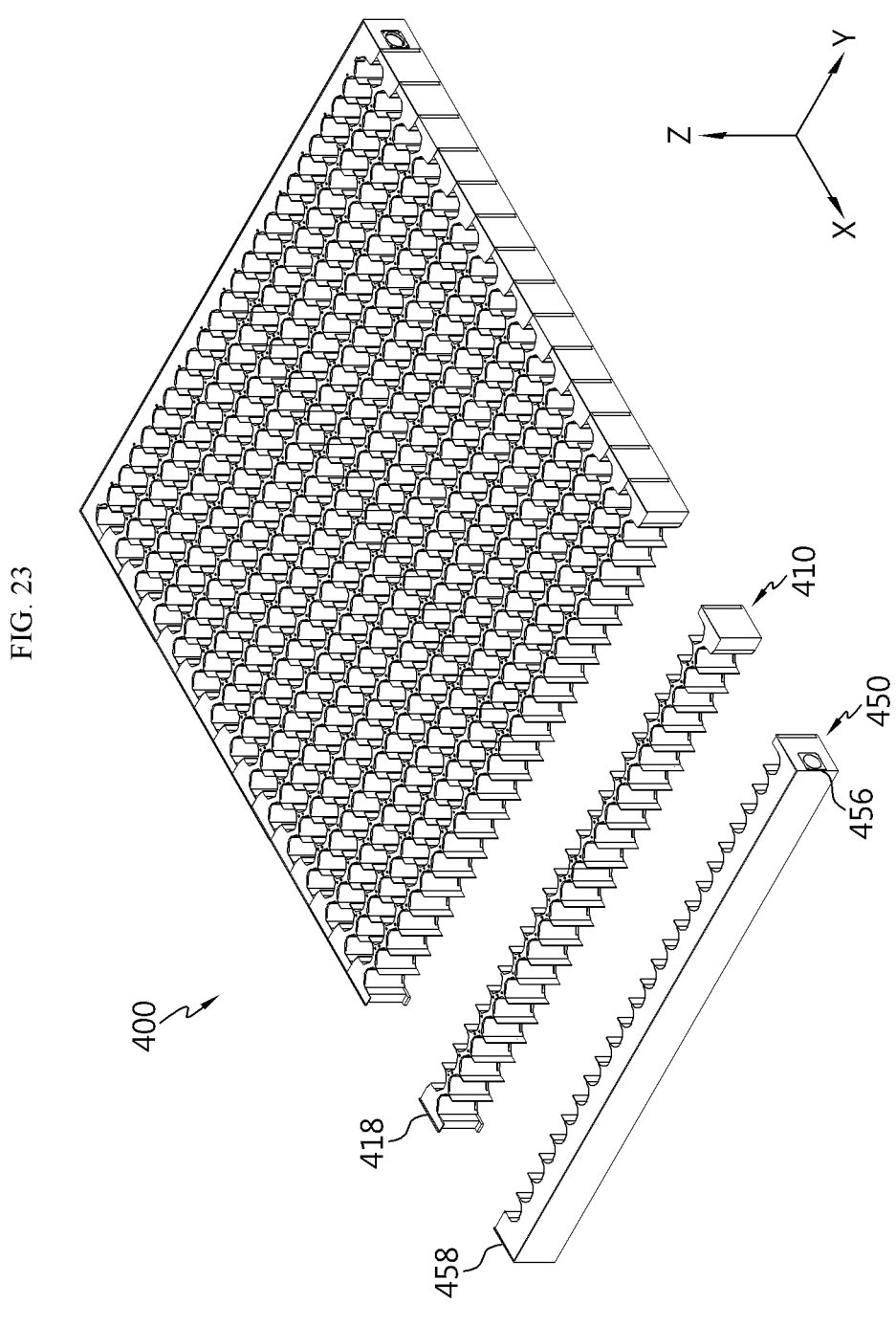
FIG. 23 is a diagram for illustrating a side structure unit of the battery pack of FIG. 2.
Figure 24:
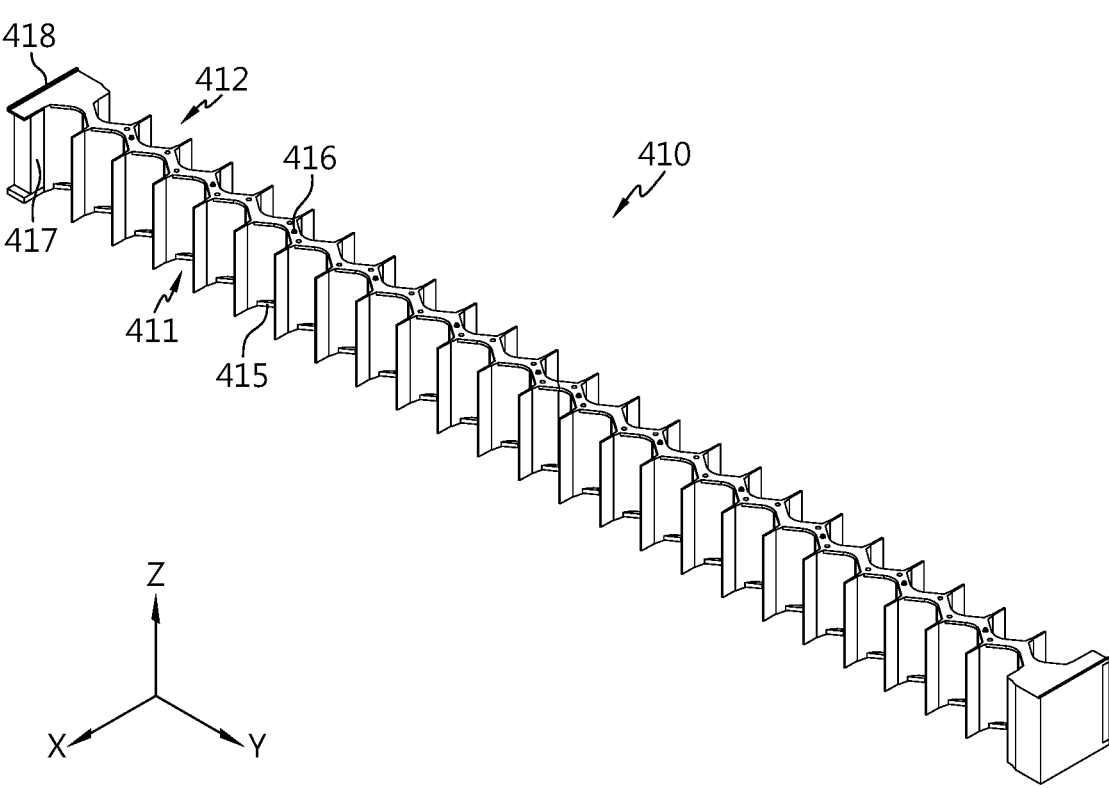
FIG. 24 is a diagram for illustrating a main plate of the side structure unit of FIG. 23.

FIG. 23 is a diagram for illustrating a side structure unit of the battery pack of FIG. 2, and FIG. 24 is a diagram for illustrating a main plate of the side structure unit of FIG. 23.

Referring to FIGS. 23 and 24, the side structure unit 400 may support the battery cells 100, secure the rigidity of the battery cells 100, and form the outer side of the side surface of the battery pack P to function as a pack case that forms the appearance of the battery pack P (see FIG. 2).

The side structure unit 400 is formed in a predetermined length along the longitudinal direction (Y-axis direction) of the battery pack P, and may accommodate and support the battery cells 100.

The side structure unit 400 may include a main plate 410 and an end plate 450.

The main plate 410 is formed in a predetermined length along the longitudinal direction (Y-axis direction) of the battery pack P, and may accommodate the battery cells 100 to be arranged in two rows in the width direction (X-axis direction) of the battery pack P. The main plate 410 is provided in plural, and the plurality of main plates 410 may be arranged to be spaced apart from each other by a predetermined distance along the width direction (X-axis direction) of the battery pack P.

The plurality of main plates 410 may secure rigidity of the battery cells 100 and the cooling unit 300, and occupy a predetermined space in the battery pack P (see FIG. 2) to reduce the injection amount of the filling member 500, explained later. The filling member 500 made of silicon resin, explained later, has a relatively high cost, and thus it is possible to further secure the cost competitiveness in manufacturing the battery pack P by reducing the injection amount of silicon resin through the plurality of main plates 410.

Each of the plurality of main plates 410 may include a first cell accommodation portion 411, a second cell accommodation portion 412, a bottom rib 415, a bus bar guide protrusion 416, a cooling unit insert groove 417, and a guide jaw 418.

The first cell accommodation portion 411 may be provided at the front side (+X-axis direction) of the main plate 410 along the longitudinal direction (Y-axis direction) of the main plate 410. The first cell accommodation portion 411 may accommodate the plurality of battery cells 100 disposed in the longitudinal direction (Y-axis direction) of the battery pack P. To this end, the first cell accommodation portion 411 may be provided in plural at the front side (+X-axis direction) of the main plate 410.

Each of the plurality of first cell accommodation portions 411 is provided in a concave shape corresponding to the outer surface of the battery cell 100, and may at least partially surround the outer surface of the battery cell 100.

The second cell accommodation portion 412 may be provided at the rear side (−X-axis direction) of the main plate 410 along the longitudinal direction (Y-axis direction) of the main plate 410. The second cell accommodation portion 412 may accommodate the plurality of battery cells 100 disposed in the longitudinal direction (Y-axis direction) of the battery pack P. To this end, the second cell accommodation portion 412 may be provided in plural at the rear side (−X-axis direction) of the main plate 410.

Each of the plurality of second cell accommodation portion 412 is provided in a concave shape corresponding to the outer surface of the battery cell 100, and may at least partially surround the outer surface of the battery cell 100.

The plurality of second cell accommodation portions 412 may be arranged alternately with the plurality of first accommodation portions 411 in the front and rear direction (X-axis direction) of the main plate 410 to accommodate the battery cells 100 provided as the cylindrical secondary batteries as much as possible.

The bottom rib 415 is provided at the bottom portion of the main plate 410, and when the battery cells 100 are accommodated in the main plate 410, the bottom rib 415 may support the bottom portion of the battery cells 100.

The bottom rib 415 may be formed to protrude in the lower direction (−Z-axis direction) further to the bottom portion of the battery cells 100 when the battery cells 100 are accommodated in the main plate 410.

The bus bar guide protrusion 416 is for fixing the connection bus bar unit 230 when assembling the bus bar assembly 200, and is provided to the upper surface of the main plate 410, and one bus bar guide protrusion 416 or a plurality of bus bar guide protrusions 416 may be provided. Hereinafter, in this embodiment, it will be described that the bus bar guide protrusion 416 is provided in plural.

When assembling the bus bar assembly 200, the bus bar guide protrusion 416 may be inserted into the guide hole 246 of the bus bar cover 240 to guide the correct positioning of the connection bus bar unit 230. Since the connection bus bar unit 230 is inserted and fixed into the bus bar guide protrusion 416, the welding process or the like for electrical connection of the bus bar assembly 200 may be performed more stably, and the welding quality during the welding process may be improved further.

The cooling unit insert groove 417 is for accommodating the end of the cooling unit 300, and may be provided at the end of the main plate 410 in the longitudinal direction (Y-axis direction). The end of the cooling unit 300 may be fixed more stably since it is disposed in the cooling unit insert groove 417 when the main plates 410 are coupled.

The guide jaw 418 may be provided to protrude to a predetermined height at both upper ends along the longitudinal direction (Y-axis direction) of the main plate 410. When the side structure unit 400 is completely assembled by coupling the main plates 410 and the end plate 450, explained later, the guide jaw 418 may form the edge of the side structure unit 400 together with an end guide jaw 458 of the end plate 450, explained later.

The end plate 450 is provided as a pair, and the pair of end plates 450 may be provided at both outermost sides in the width direction (X-axis direction) of the side structure unit 400. The pair of end plates 450 may accommodate and support the battery cells 100 together with the main plate 410 disposed at the opposite side.

The pair of end plates 450 may have a terminal hole 456 and an end guide jaw 458.

The terminal hole 456 is for accommodating the connector terminals 280, 290, and may be provided at one end of the end plate 450.

The end guide jaw 458 is formed along the upper edge of the end plate 450, and may be provided to protrude at the same height as the guide jaw 418. The end guide jaw 458 may form the edge of the side structure unit 400 together with the guide jaw 418 of the main plates 410 when the side structure unit 400 is completely assembled.

Hereinafter, the coupling structure of the battery cells 100 and the cooling units 300 through the side structure unit 400 will be described in more detail.

Figure 25:
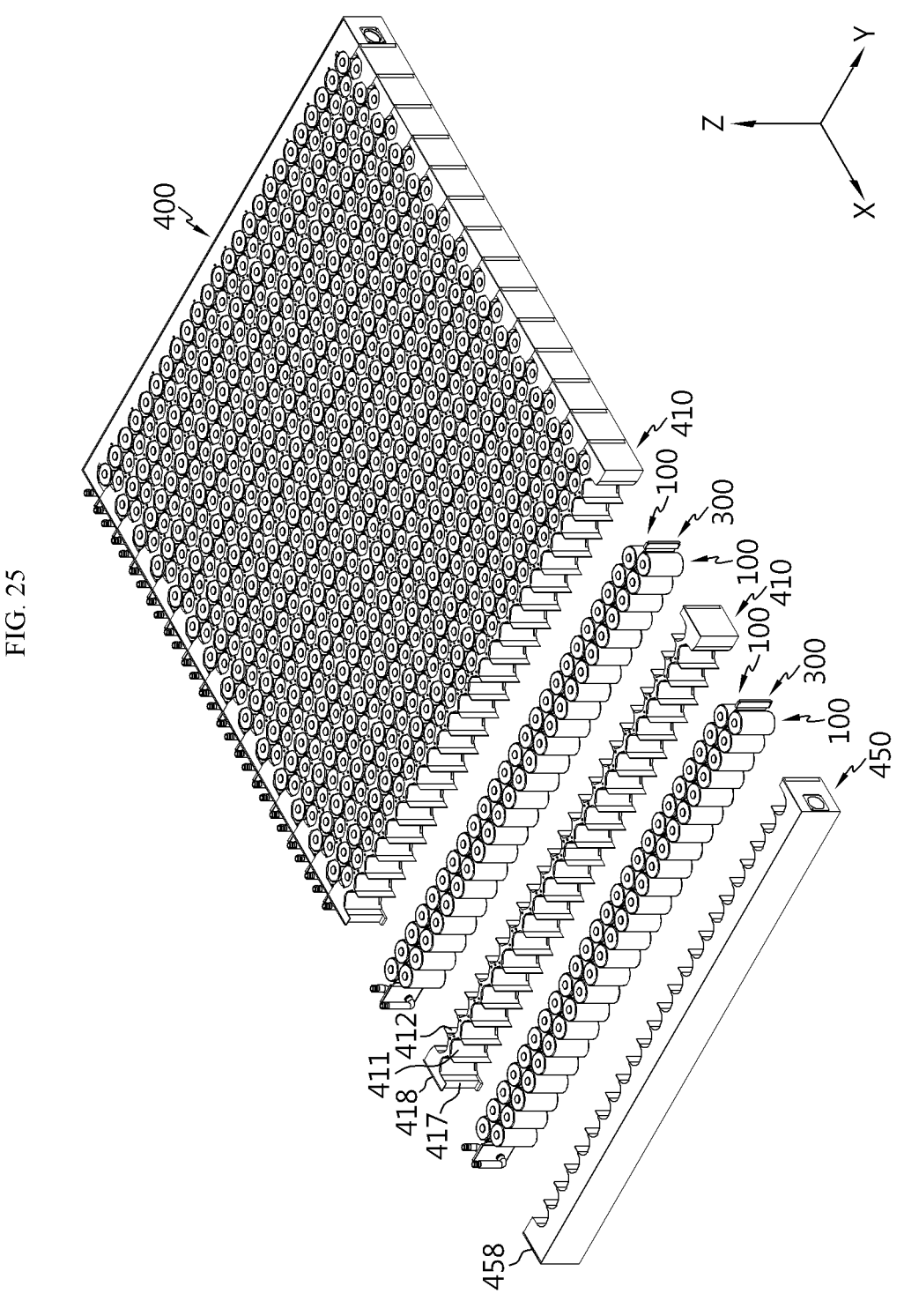
FIGS. 25 and 26 are diagrams for illustrating a coupling structure between the battery cells and the cooling units through the side structure unit of FIG. 23.
Figure 26:
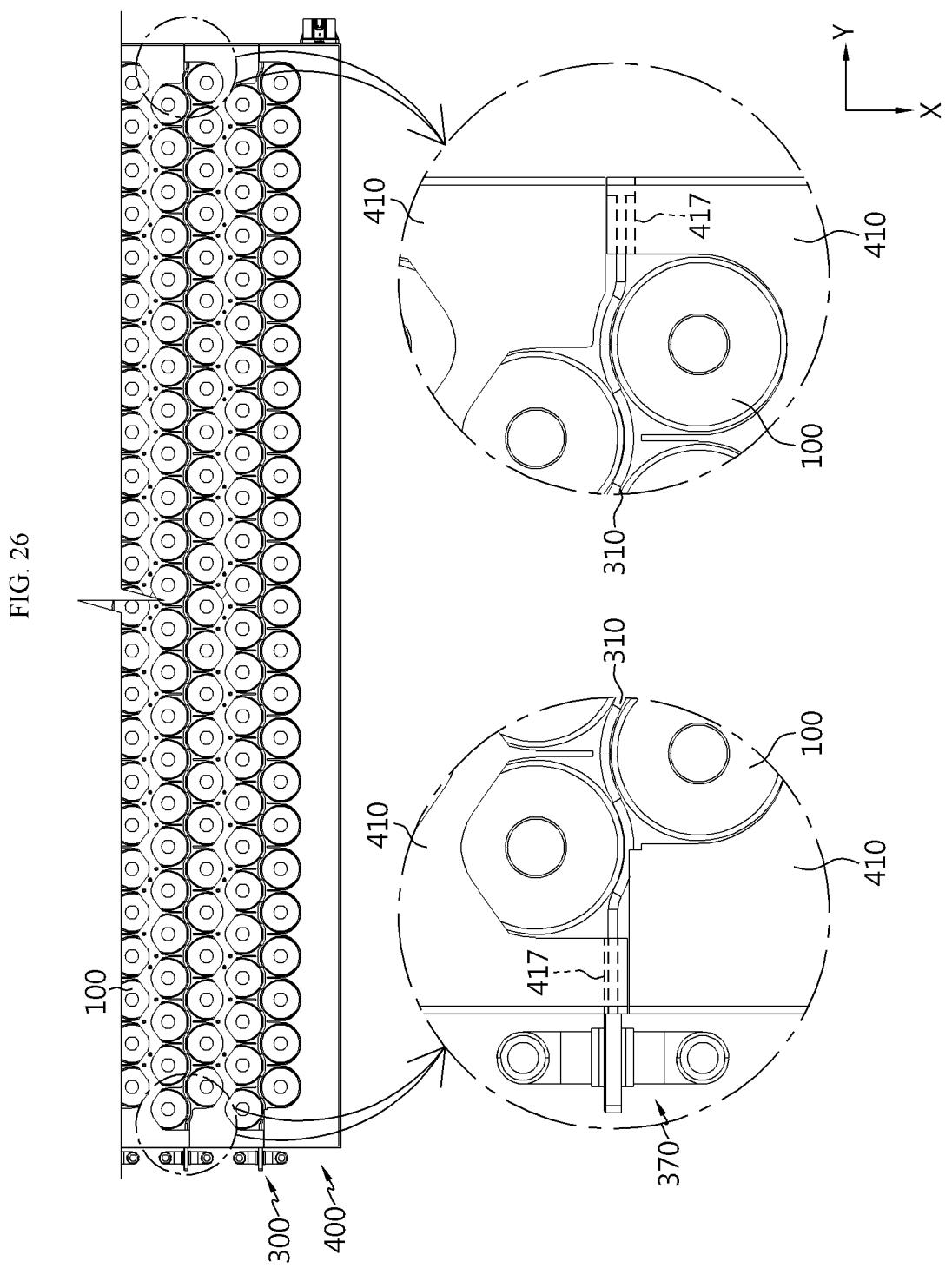

FIGS. 25 and 26 are diagrams for illustrating a coupling structure between the battery cells and the cooling units through the side structure unit of FIG. 23.

Referring to FIGS. 25 and 26, first, the cooling tube 310 of the cooling unit 300 may be inserted between the battery cells 100 arranged in two front and rear rows along the width direction (X-axis direction) of the battery pack P (see FIG. 2) among the battery cells 100. The side structure unit 400 may accommodate the battery cells 100 facing each other in the front and rear direction (X-axis direction) of the battery cells 100 between which the cooling tube 310 is inserted.

Specifically, in the width direction (X-axis direction) of the battery pack P (see FIG. 2), the end plate 450 disposed at the outermost side, the battery cells 100, the cooling tube 310, the battery cells 100, and the main plate 410 are arranged, and then, the battery cells 100, the cooling tube 310, the battery cells 100, and the main plate 410 may be arranged in order and coupled. After that, in the width direction (X-axis direction) of the battery pack P (see FIG. 2), the end plate 450 disposed at the opposite outermost side may be finally disposed and coupled to complete the coupling of the side structure unit 400 so that the battery cells 100 and the cooling units 300 may be accommodated in the side structure unit 400.

Here, both ends of the cooling unit 300 may be inserted into the cooling unit insert groove 417 when the main plates 410 are coupled and the main plate 410 and the end plate 450 are coupled, thereby preventing interference with the cooling unit 300 while fixing the cooling unit 300 more stably.

Meanwhile, the cooling water inlet/outlet portion 370 provided at one end of the cooling units 300 may be disposed to protrude out of the side structure unit 400 for connection with an external cooling line or the like.

The side structure unit 400 according to this embodiment may form a side outer structure of the battery pack P (see FIG. 2) by coupling the main plates 410 and the end plates 450 to each other while accommodating the battery cells 100 and the cooling units 300. That is, the side structure unit 400 may function as a pack case that forms the appearance of the battery pack P.

Accordingly, the battery pack P (see FIG. 1) according to this embodiment may omit a separate additional pack case or pack housing structure by means of the side structure unit 400, thereby lowering the manufacturing cost and reducing the overall size of the battery pack P while further including the energy density.

Figure 27:
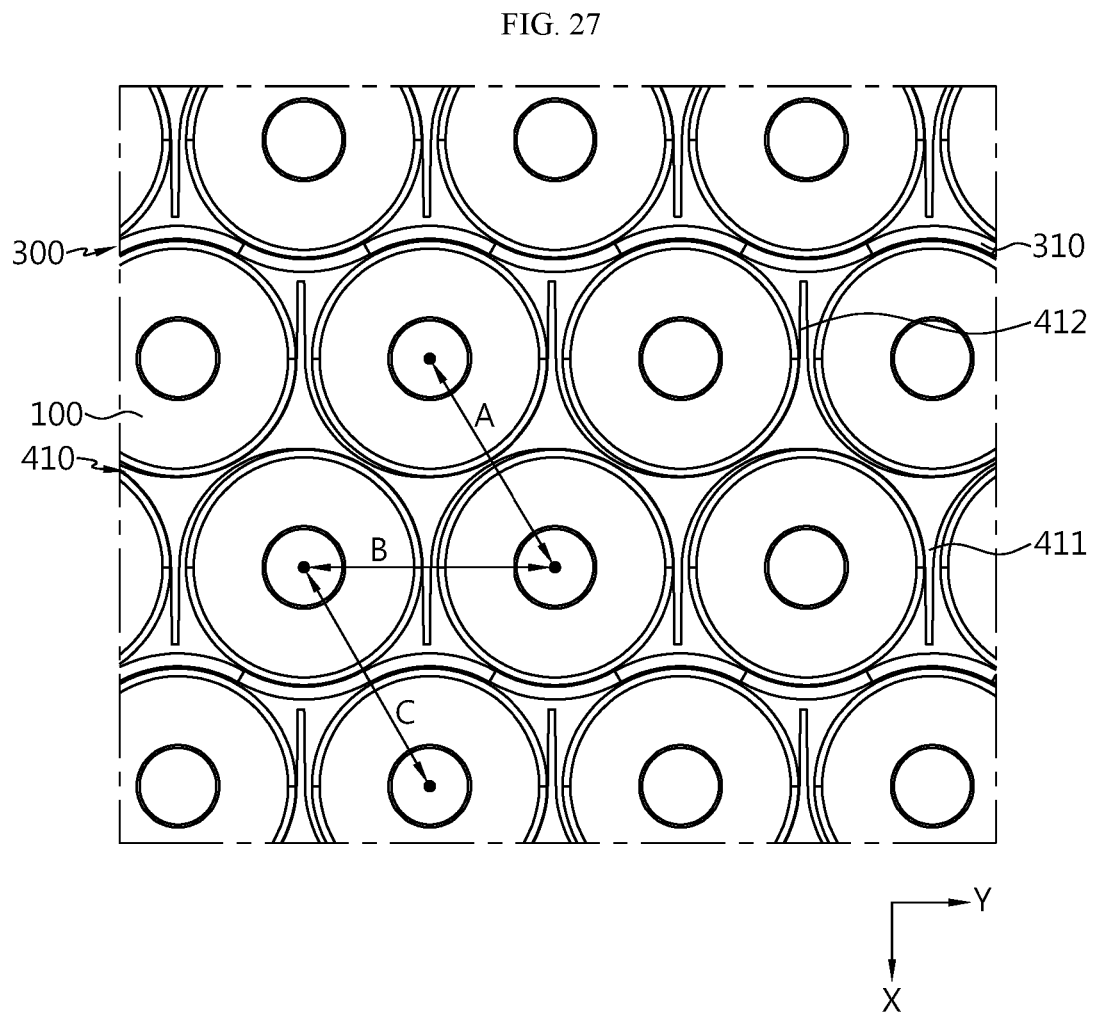

FIG. 27 is a diagram for illustrating an arrangement relationship of the battery cells and the cooling units through the side structure unit of FIG. 23.

Referring to FIG. 27, the distance A between the centers of the battery cells 100 provided between the first cell accommodation portion 411 and the second cell accommodation portion 412 of the main plate 410 is a distance set for close contact with the main plate 410, and may be changed according to the thickness of the main plate 410.

In addition, the distance B between the centers of the adjacent battery cells 100 in contact with one surface of the cooling tube 310 is a distance set to make a contact angle of the battery cells 100 and the cooling tube 310 as a predetermined angle, for example 60 degrees, and may be changed in conjunction with the distance C, explained later. The distance C between the centers of the battery cells 100 disposed to face each other with the cooling tube 310 interposed therebetween is a distance reflecting the thickness of the cooling tube 310, and may be determined in conjunction with the distance B between the centers of the adjacent battery cells 100 in contact with one side of the cooling tube 310.

The distances A to C may be set as optimal distances for closer adhesion among the battery cells 100, the cooling tube 310 and the side structure unit 400.

Meanwhile, the ends of the first cell accommodation portion 411 and the second accommodation portion 412 of the main plates 410 may be formed shorter than one surface of the battery cells 100 in contact with the cooling tube 310 in order to prevent interference of the cooling tubes 310 facing the main plates 410. Specifically, the ends of the first cell accommodation portion 411 and the second accommodation portion 412 may be spaced apart from the cooling tube 310 to have a predetermined gap.

Figure 28:
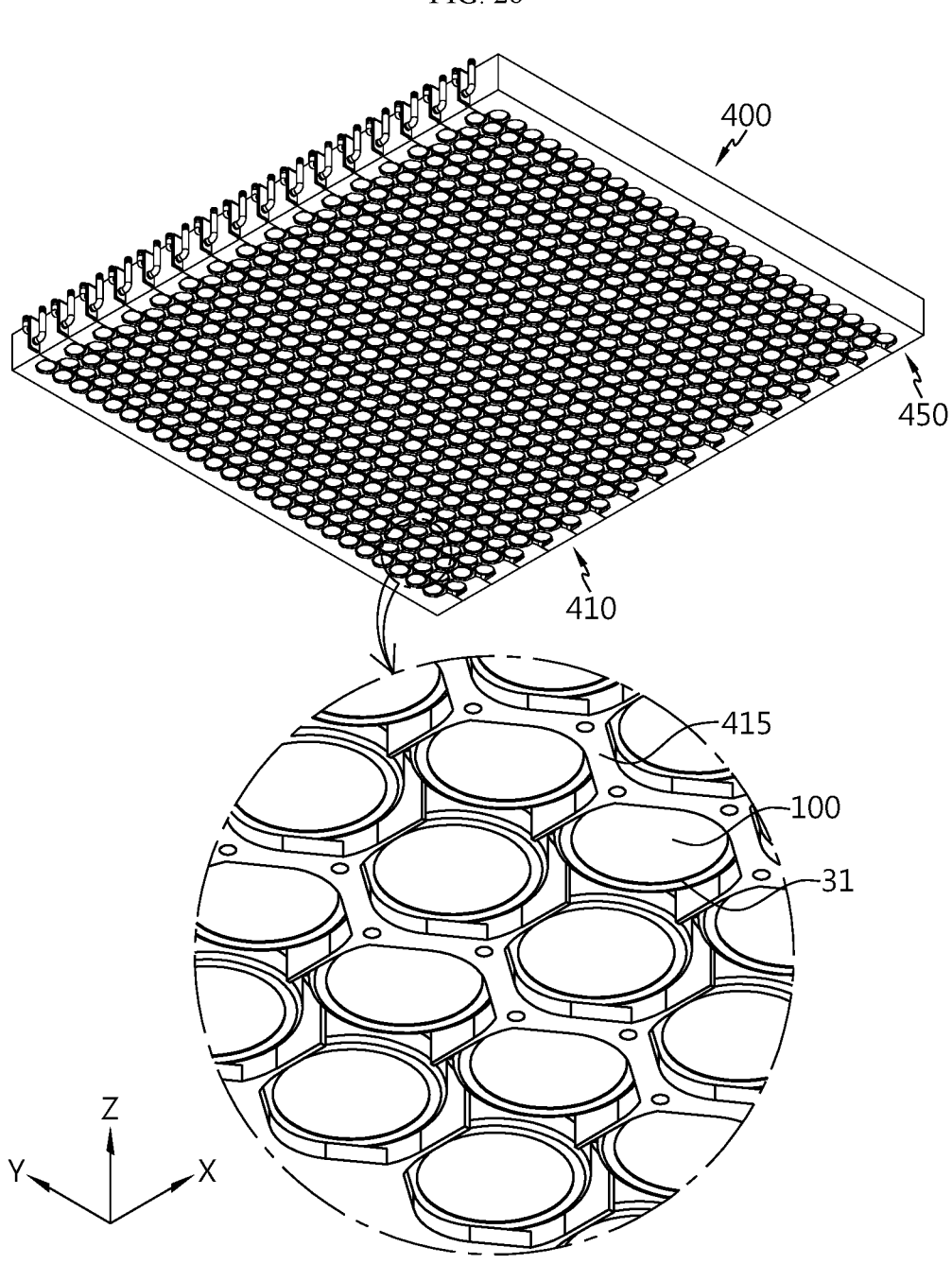
FIG. 28 is a bottom view showing the side structure unit when the side structure unit of FIG. 23 is coupled to the battery cells.
Figure 29:
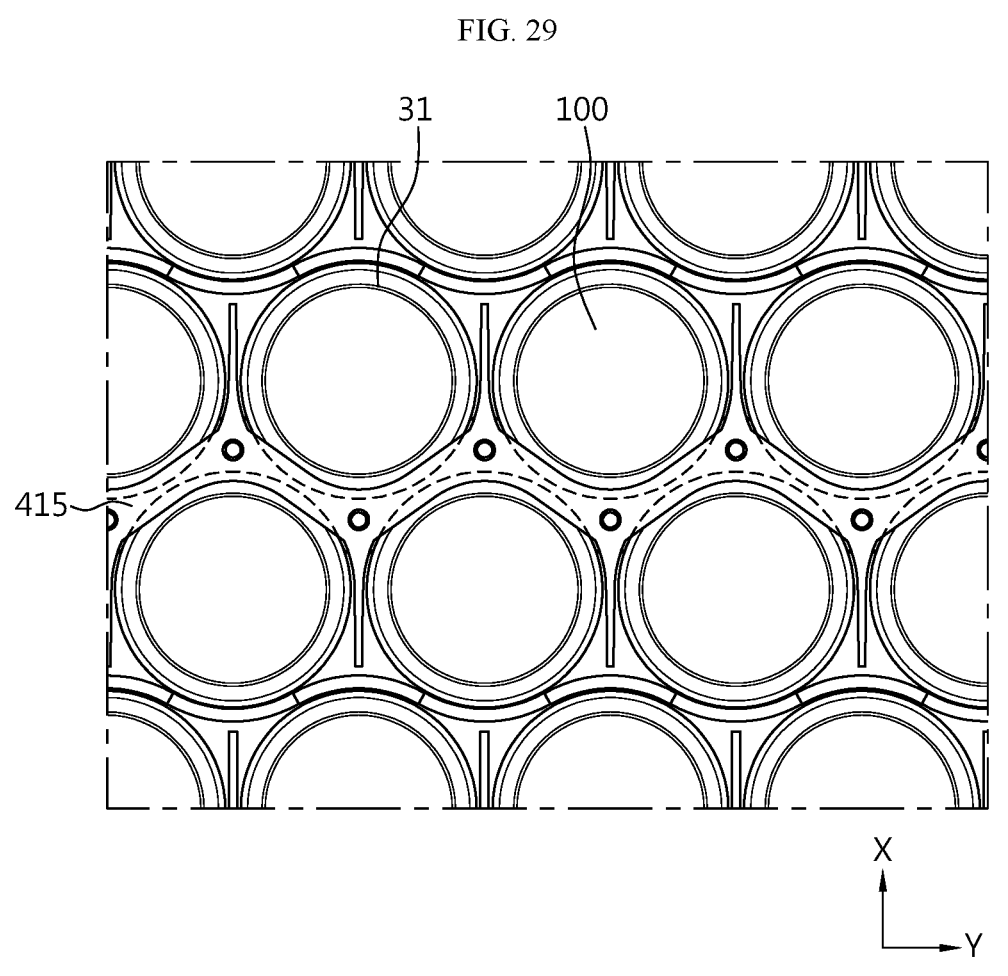

FIG. 28 is a bottom view showing the side structure unit when the side structure unit of FIG. 23 is coupled to the battery cells, and FIG. 29 is an enlarged bottom view showing a main part of the side structure unit of FIG. 28.

Referring to FIGS. 28 and 29, the bottom rib 415 of the side structure unit 400 may be provided protrude downward (−Z-axis direction) further to the bottom portion of the battery cells 100, without interfering with the venting portion 31 of the battery cells 100. Accordingly, when gas is discharged through the venting portion 31 due to overheating of the battery cells 100, the gas may be discharged more quickly without interference of the bottom rib 415.

Moreover, the bottom rib 415 may be provided to cover one side of the bottom portion of the battery cells 100, so that when the battery cells 100 may be fixed in the side structure unit 400 more firmly when being accommodated in the side structure unit 400.

Referring to FIG. 2 again, the battery pack P may include a filling member 500.

The filling member 500 may be filled in a space between the cooling unit 300 and the plurality of battery cells 100 in the height direction (Z-axis direction) of the battery pack P. Meanwhile, in FIG. 2, the filling member 500 is indicated by a dotted line in a hexahedral shape for convenience of understanding, and the filling member 500 may be filled in the entire space between the cooling unit 300 and the plurality of battery cells 100.

The filling member 500 may cover the upper side and the lower side of the battery pack P (see FIG. 2) to form a pack case structure of the battery pack P together with the side structure unit 400.

In addition, the filling member 500 may more stably fix the plurality of battery cells 100 and increase heat dissipation efficiency of the plurality of battery cells 100 to further improve the cooling performance of the battery cells 100.

The filling member 500 may be made of a potting resin. The potting resin may be formed by injecting a dilute resin material into the plurality of battery cells 100 and curing the same. Here, the injection of the resin material may be performed at a room temperature of approximately 15° C. to 25° C. to prevent thermal damage to the plurality of battery cells 100.

Specifically, the filling member 500 may be made of a silicon resin. The present disclosure is not limited thereto, and the filling member 500 may be made of other resin materials that may improve the fixing and heat dissipation efficiency of the battery cells 100, in addition to the silicon resin.

More specifically, as the filling member 500 covers the portion of the battery cells 100 that is not in contact with the cooling tube 310, it is possible to guide the thermal equilibrium of the battery cells 100 and prevent the cooling deviation of the battery cells 100, thereby preventing local degradation of the battery cells 100. In addition, the safety of the battery cells 100 may also be significantly improved by preventing local degradation of the battery cells 100.

In addition, when at least one specific battery cell 100 is damaged due to an abnormal situation among the plurality of battery cells 100, the filling member 500 may perform an insulating role of preventing electric connection to adjacent battery cells 100.

In addition, the filling member 500 may include a material having high specific heat performance. Accordingly, the filling member 500 increases the thermal mass to delay the temperature rise of the battery cells 100 even in a situation such as rapid charging and discharging of the battery cells 100, thereby preventing the rapid temperature rise of the battery cells 100.

In addition, the filling member 500 may include a glass bubble. The glass bubble may lower the specific gravity of the filling member 500 to increase the energy density to weight.

In addition, the filling member 500 may include a material having high heat resistance. Accordingly, when a thermal event caused by overheating or the like occurs in at least one specific battery cell 100 among the plurality of battery cells 100, the filling member 500 may effectively prevent thermal runaway toward adjacent battery cells.

In addition, the filling member 500 may include a material having high flame retardant performance. Accordingly, the filling member 500 may minimize the risk of fire when a thermal event occurs due to overheating or the like in at least one specific battery cell 100 among the plurality of battery cells 100.

The filling member 500 may also be filled in the bus bar assembly 200 in addition to the battery cells 100. Specifically, the filling member 500 may be filled in the bus bar assembly 200 to cover the upper side of the bus bar assembly 200.

Here, the filling member 500 may be filled continuously between the bus bar assembly 200 and the battery cells 100 in the upper and lower direction (Z-axis direction) of the battery cells 100, without an isolated space or a separated space between the bus bar assembly 200 and the battery cells 100.

Since the filling member 500 according to this embodiment is continuously filled without interruption in the battery cells 100 and the bus bar assembly 200, it is possible to realizing even heat dissipation without causing heat dissipation deviation in the area between the battery cells 100 and the bus bar assembly 200, thereby significantly improving the cooling performance of the battery pack P.

Moreover, the filling member 500 may be filled in a portion other than the outer side of the side surface of the side structure unit 400. Here, the filling member 500 may be continuously filled in the battery cells 100, the bus bar assembly 200 and the side structure unit 400 without interruption. Accordingly, the cooling performance of the battery pack P may be further improved.

Hereinafter, the formation of the pack case structure through the injection of the filling member 500 will be described in more detail.

Figure 30:
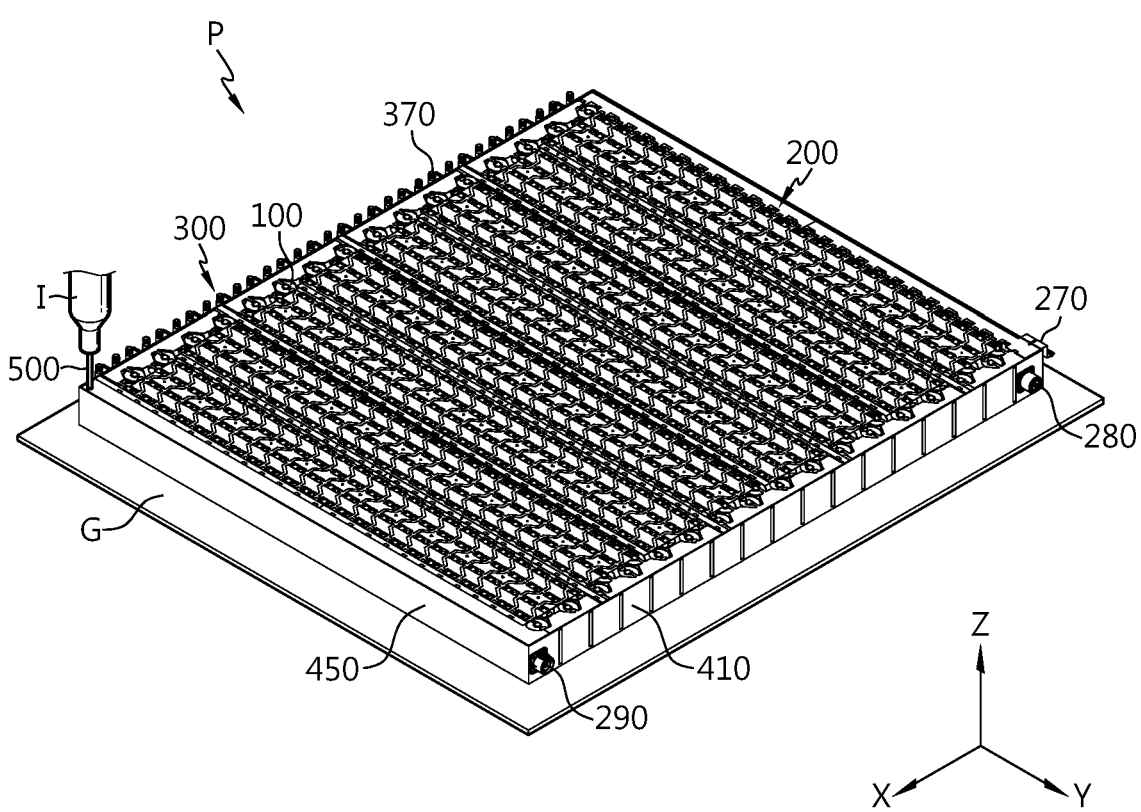
FIGS. 30 to 32 are diagrams for illustrating the formation of a pack case structure by injecting a filling member into the battery pack of FIG. 2.
Figure 31:
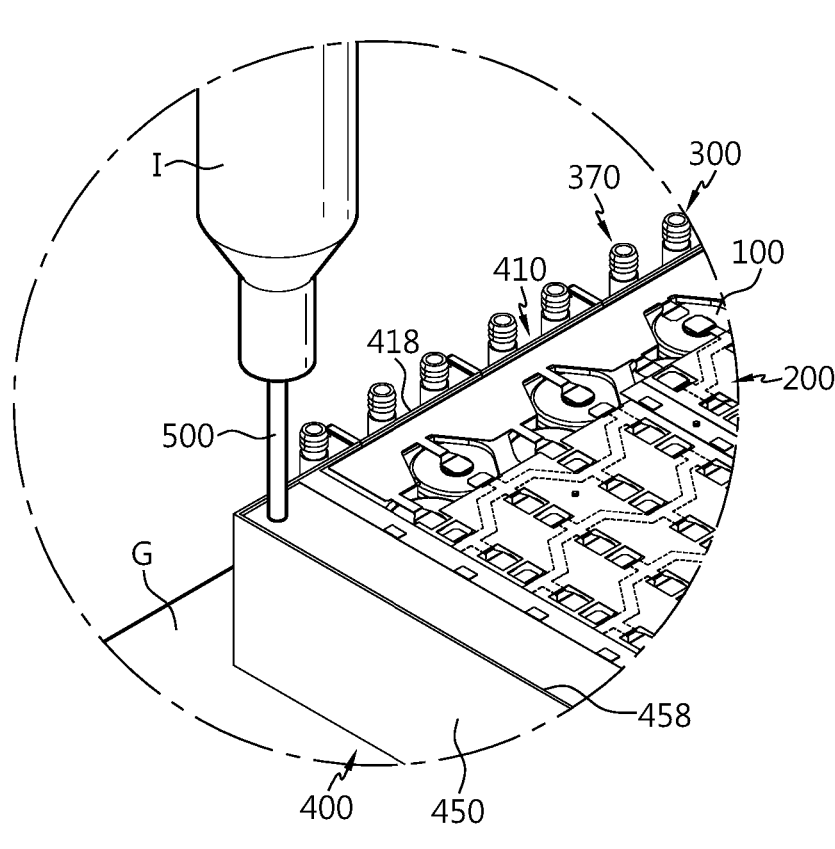
Figure 32:
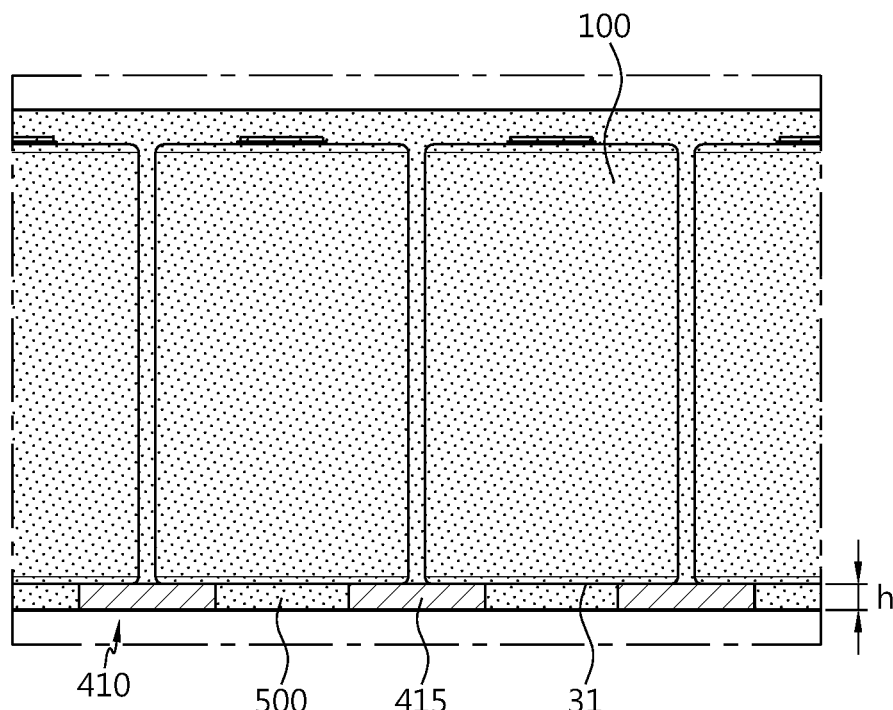

FIGS. 30 to 32 are diagrams for illustrating the formation of a pack case structure by injecting a filling member into the battery pack of FIG. 2.

Referring to FIGS. 30 to 32, a manufacturer or the like may inject and apply the filling member 500 provided as the silicon resin by using a resin injection device I to form the pack case structure of the upper side and the lower side of the battery pack P (see FIG. 2) by means of the filling member 500 provided as the resin material. Specifically, the filling member 500 may be filled up to the protrusion height h of the bottom rib 415 while covering the upper side of the bus bar assembly 200 in the upper direction (+Z-axis direction) of the battery pack P and covering the lower side of the battery cells 100 in the lower direction (−Z-axis direction) of the battery pack P. Here, the protrusion height h of the bottom rib 415 may be designed to a predetermined height in consideration of the injection amount of the filling member 500.

In the injection and coating process of the filling member 500 by using the resin injection device I, an injection guider G may be provided to the bottom portion of the side structure unit 400 in order to prevent resin leakage in the lower direction (−Z-axis direction) when the filling member 500 is injected. The injection guider G may be made of a Teflon material or the like for easy detachment after the filling member 500 is cured.

In the injection and coating process of the filling member 500, the side structure unit 400 may serve as a mold for preventing the resin leaking while supporting the battery cells 100 and the cooling unit 300 together with the injection guider G.

Accordingly, in this embodiment, by means of the side structure unit 400, during the injection and coating process of the filling member 500, an additional injection guiding jig structure in the side direction is not required, thereby significantly improving working efficiency while reducing the manufacturing cost.

In addition, by means of the guide jaw 418 and the end guide jaw 458 formed at the edge of the upper surface of the side structure unit 400, when the filling member 500 is injected, the injection accuracy of the filling member 500 is increased, so that the filling member 500 may be easily injected to cover the bus bar assembly 200 more securely, and it is also possible to effectively prevent the filling member 500 from overflowing.

Here, the side structure unit 400 exposes components such as the sensing interconnection board 270, the connector terminals 280, 290 and the cooling water inlet/outlet portion 370, which are connected to an external device, and thus a problem such as interference with these components may not occur while injecting or applying the filling member 500.

Accordingly, in this embodiment, since a pack case structure of the battery pack P (see FIG. 1) is formed by means of the side structure unit 400 and the filling member 500, the assembly process of the battery pack P may be simplified compared to the prior art where the pack case structure is formed as a complicated assembly of a plurality of plates, thereby significantly lowering the manufacturing cost to secure the cost competitiveness.

Moreover, in this embodiment, by means of the pack case structure prepared using the side structure unit 400 and the filling member 500, compared to the prior art where the pack case structure is provided as a cell frame structure composed of an assembly of a plurality of plates, the entire size of the battery pack P may be reduced, thereby significantly increasing the energy density.

Figure 33:
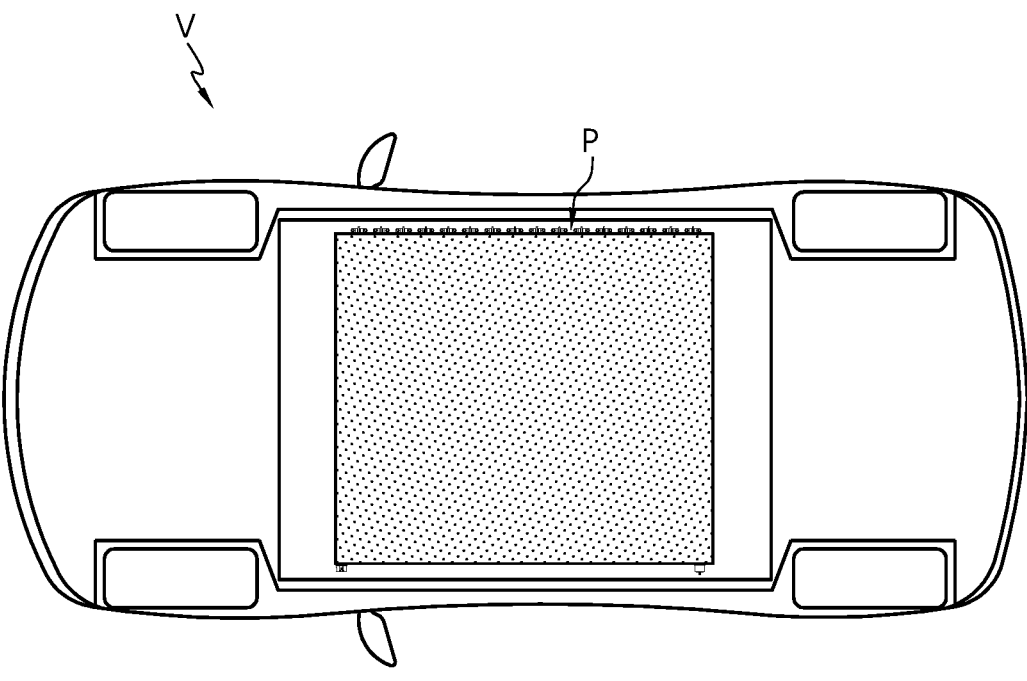
FIG. 33 is a diagram for illustrating a vehicle according to an embodiment of the present disclosure.

FIG. 33 is a diagram for illustrating a vehicle according to an embodiment of the present disclosure.

Referring to FIG. 33, a vehicle V may be provided as an electric vehicle or a hybrid electric vehicle, and may include at least one battery pack P of the former embodiment as an energy source.

In this embodiment, since the battery pack P described above is provided in a compact structure having a high energy density, when the battery pack P is mounted to the vehicle V, it is easy to implement a modular structure of a plurality of battery pack P, and a relatively high degree of mounting freedom may be secured even for various internal space shapes of the vehicle V.

According to various embodiments as above, it is possible to provide a battery pack P capable of securing rigidity while increasing energy density, and a vehicle V including the battery pack P.

In addition, according to various embodiments as above, it is possible to provide a battery pack P capable of improving cost competitiveness and manufacturing efficiency, and a vehicle V including the battery pack P.

Moreover, according to various embodiments as above, it is possible to provide a battery pack P capable of improving cooling performance, and a vehicle V including the battery pack P.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack, comprising:

a plurality of battery cells arranged along a longitudinal direction and a width direction of the battery pack; and a bus bar assembly disposed at one side of the plurality of battery cells and configured to electrically connect the plurality of battery cells, wherein the bus bar assembly includes:

a connection bus bar connected in series and in parallel to adjacent battery cells of the plurality of battery cells in the longitudinal direction and the width direction; and a fusing portion formed in the connection bus bar and configured to block an electrical connection of a battery cell in which an abnormal situation occurs in both serial and parallel connection directions from among the plurality of battery cells, wherein the connection bus bar includes:

a parallel connection portion formed along any one of the longitudinal direction and the width direction and configured to connect the adjacent battery cells in parallel;

a serial connection portion formed along the other one of the longitudinal direction and the width direction and configured to connect the adjacent battery cells in series; and an interconnection portion configured to connect the parallel connection portion and the serial connection portion to each other, and wherein the fusing portion is integrally formed in the interconnection portion where the parallel connection portion and the serial connection portion intersects.

2. The battery pack according to claim 1, wherein the connection bus bar is provided as a single layer in a strip shape having a predetermined length and width.

3. The battery pack according to claim 2, wherein the strip shape corresponds to an arrangement structure of the plurality of battery cells.

4. The battery pack according to claim 1, wherein the fusing portion is configured to reduce a width of the interconnection portion.

5. The battery pack according to claim 1, wherein the fusing portion is formed to be recessed from the interconnection portion by a predetermined depth.

6. The battery pack according to claim 1, wherein the fusing portion is formed at each corner of an edge of the interconnection portion.

7. The battery pack according to claim 1, wherein the fusing portion has a hole shape of a predetermined size capable of reducing a width of an edge of the interconnection portion.

8. The battery pack according to claim 1, wherein the fusing portion is configured to sequentially block the electrical connection of the parallel connection portion and the serial connection portion connected to the battery cell in which the abnormal situation occurs from among the plurality of battery cells.

9. The battery pack according to claim 1, wherein the serial connection portion includes:

a positive electrode connection portion configured to protrusively extend from the interconnection portion by a predetermined length; and a negative electrode connection portion provided at a side opposite to the positive electrode connection portion and configured to protrusively extend from the interconnection portion by a predetermined length.

10. The battery pack according to claim 9, wherein in a height direction of the bus bar assembly, a height between the positive electrode connection portion and the negative electrode connection portion is equal to a protrusion height of a positive electrode at one surface of a battery cell from among the plurality of battery cells.

11. The battery pack according to claim 10, wherein in the height direction of the bus bar assembly, a height of the interconnection portion is greater than a height of the positive electrode connection portion and the negative electrode connection portion.

12. The battery pack according to claim 1, wherein the bus bar assembly includes a bus bar cover configured to cover the connection bus bar.

13. The battery pack according to claim 12, wherein the bus bar cover is provided as a pair, and wherein the connection bus bar is inserted between the pair of bus bar covers.

14. The battery pack according to claim 13, wherein the pair of bus bar covers include:

a first cover configured to cover one side of the connection bus bar; and a second cover coupled to the first cover and configured to cover the other side of the connection bus bar.

15. The battery pack according to claim 12, wherein the bus bar cover has a bus bar hole having an open space of a predetermined size capable of exposing the serial connection portion.

16. The battery pack according to claim 15, wherein the bus bar hole has the open space with a greater size than the serial connection portion.

17. The battery pack according to claim 12, wherein the bus bar cover includes an insulating material.

18. The battery pack according to claim 17, wherein the bus bar cover includes a polyimide film.

19. The battery pack according to claim 12, wherein the connection bus bar is provided in plural, and the bus bar cover covers the plurality of connection bus bars.

20. The battery pack according to claim 12, wherein the bus bar cover has a guide hole formed to guide an assembling location of the bus bar assembly.

21. A vehicle, comprising at least one of the battery pack according to claim 1.

22. A bus bar assembly, which electrically connects a plurality of battery cells of a battery pack, the bus bar assembly comprising:

a connection bus bar having a strip shape with a predetermined length and width and configured to be connected in series and in parallel to the plurality of battery cells; and a fusing portion formed in the connection bus bar and configured to block an electrical connection of a battery cell in which an abnormal situation occurs in both serial and parallel connection directions from among the plurality of battery cells, wherein the connection bus bar includes:

a parallel connection portion formed along any one of a longitudinal direction and a width direction of the bus bar assembly and configured to connect the plurality of battery cells in parallel;

a serial connection portion formed along the other one of the longitudinal direction and the width direction of the bus bar assembly and configured to connect the plurality of battery cells in series; and an interconnection portion configured to connect the parallel connection portion and the serial connection portion to each other, and wherein the fusing portion is integrally formed in the interconnection portion where the parallel connection portion and the serial connection portion intersects.

23. The bus bar assembly according to claim 22, wherein the connection bus bar is provided as a single layer.

24. The bus bar assembly according to claim 22, wherein the fusing portion is configured to reduce a width of the interconnection portion.

* * * * *